(12) United States Patent
Petilli

(10) Patent No.: US 9,001,234 B2
(45) Date of Patent: Apr. 7, 2015

(54) IMAGER READOUT ARCHITECTURE UTILIZING A/D CONVERTERS (ADC)

(75) Inventor: Eugene M. Petilli, Victor, NY (US)

(73) Assignee: Intrinsix Corporation, Marlborough, MA (US)

( * ) Notice: Subject to any disclaimer, the term of this patent is extended or adjusted under 35 U.S.C. 154(b) by 399 days.

(21) Appl. No.: 13/405,406

(22) Filed: Feb. 27, 2012

(65) Prior Publication Data

US 2012/0218445 A1    Aug. 30, 2012

Related U.S. Application Data

(60) Provisional application No. 61/446,582, filed on Feb. 25, 2011.

(51) Int. Cl.
| | |
|---|---|
| *H04N 5/235* | (2006.01) |
| *H04N 5/378* | (2011.01) |
| *H04N 5/357* | (2011.01) |
| *H04N 5/262* | (2006.01) |
| *H04N 5/33* | (2006.01) |

(52) U.S. Cl.
CPC ............... *H04N 5/378* (2013.01); *H04N 5/357* (2013.01); *H04N 5/33* (2013.01)

(58) Field of Classification Search
CPC . H04N 3/1575; H04N 3/1562; H04N 5/3454; H04N 3/3456; H04N 5/3452; H04N 5/345; H04N 5/378; H04N 5/37213
USPC ..................... 348/230.1, 240.2, 305, 316, 320
See application file for complete search history.

(56) References Cited

U.S. PATENT DOCUMENTS

| | | | | |
|---|---|---|---|---|
| 4,661,713 | A * | 4/1987 | Besson et al. | 250/208.3 |
| 5,291,293 | A * | 3/1994 | Kapan | 348/246 |
| 6,977,601 | B1 | 12/2005 | Fletcher et al. | |
| 7,492,400 | B2 | 2/2009 | El Gamal et al. | |
| 8,314,850 | B2 * | 11/2012 | Negishi et al. | 348/223.1 |
| 2004/0257078 | A1 * | 12/2004 | Porter | 324/307 |

(Continued)

OTHER PUBLICATIONS

Maricic, Danijel; "Image Sensors Employing Oversampling Sigma-Delta Analog-to-Digital Conversion with High Dynamic Range and Low Power", Department of Electrical and Computer Engineering Arts, Sciences and Engineering, Edmund A. Hajim School of Engineering and Applied Sciences, University of Rochester, Rochester, NY, 2011, 136 pages.

(Continued)

*Primary Examiner* — Hung Lam
(74) *Attorney, Agent, or Firm* — Daly, Crowley, Mofford & Durkee, LLP

(57) ABSTRACT

The invention provides an imager readout architecture utilizing analog-to-digital converters (ADC), the architecture comprising a band-limited sigma delta modulator (SDM) ADC; and a serpentine readout, which can be configured to allow the band-limited SDM to multiplex between multiple columns by avoiding discontinuities at the edges of a row. SDM ADC image reconstruction artifacts are minimized using a modified serpentine read out methodology, the methodology comprising using primary and redundant slices with the serpentine read out in opposite directions and averaging the slices. Advantageously, the invention can be used to develop a read out integrated circuit (ROIC) for strained layer superlattice imagers (SLS) using sigma delta modulator (SDM) based analog to digital converters (SDM ADC).

9 Claims, 34 Drawing Sheets

(56) References Cited

U.S. PATENT DOCUMENTS

2007/0253695 A1* 11/2007 Miyazawa et al. ............ 396/234
2008/0317314 A1* 12/2008 Schwartz et al. ............. 382/131

OTHER PUBLICATIONS

Tyrrell, Brian, & Berger, Robert, & Colonero, Curtis, & Costa, Joseph, & Kelly, Michael, & Ringdahl, Eric, & Schultz, Kenneth, & Wey, James of Lincoln Laboratory, Massachusetts Institute of Technology. Design Approaches for Digitally Dominated Active Pixel Sensors: Leveraging Moore's Law Scaling in Focal Plane Readout Design. *This work was sponsored by the United States Government under Air Force contract FA8721-05-C-0002.* SPIE vol. 6900 (2008).

Tyrrell, Brian, & Anderson, Kirk, & Baker, Justin, & Berger, Robert, & Brown, Matthew, & Colonero, Curtis, & Costa, Joseph, & Holford, Brian, & Kelly, Michael, & Ringdahl, Eric, & Schultz, Kenneth, & Wey, James. Time Delay Integration and In-Pixel Spatiotemporal Filtering Using a Nanoscale Digital CMOS Focal Plane Readout. *IEEE Transactions On Electron Devices*, vol. 56, No. 11, Nov. 2009.

Kelly, Michael, & Colonero, Curtis, & Tyrrell, Brian, & Schultz, Kenneth of Lincoln Laboratory, Massachusetts Institute of Technology. The Digital Focal Plane Array (DFPA) Architecture for Data Processing "On-Chip" Mil. Sens. Symp.Detector Spec. Gp., *Feb. 2007, This work was sponsored by the United States Government under Air Force contract FA8721-05-C-0002.*

Hill, Cory J., & Soibel, Alexander, & Keo, Sam A., & Mumolo, Jason. M., & Gunapala, Sarath. D. of Jet Propulsion Laboratory, California Institute of Technology, & Rhiger, David R., & Kvaas, Robert E., & Harris, Sean F of Raytheon Vision Systems. Infrared Imaging Arrays Based on Superlattice Photodiodes. *Infrared Technology and Applications XXXIV, edited by Bjorn F. Andresen, Gabor F. Fulop, Paul R. Norton, Proc. of SPIE* vol. 6940, 69400C, (2008) • 0277-786X/08 doi: 10.1117/12.783934.

Chen, Leonard, Hewitt, Mary, & Guibransen, Dave,& Pettijohn, Kevin, & Chen, Bryan, & Wyles, Richard of the Raytheon Infrared Center of Excellence. Overview of advances in high performance ROIC designs for use with IRFPAs, SPIE vol. 4028 (2000).

Das, Sankha dip, & Tan, Siew Li, & Zhang, Shiyong, & Goh, Yu Ling,& Tan, Chee Hing, & David, John of The Department of Electronic & Electrical Engineering, University of Sheffield. Development of LWIR Photodiodes Based on InAs/GaSb Type II Strained Layer Superlattices. *6th EMRS DTC Technical Conference—Edinburgh 2009.*

Johnson, J. L., & Samoska, L. A., & Gossard, A. C. of The Department of Electrical and Computer Engineering, University of California, Santa Barbara, & Merz, J. L. of The Department of Electrical Engineering, University of Notre Dame, & Jack, M. D., & Chapman, G. R., & Baumgratz, B. A., & Kosai, K., & Johnson, S. M. of The Santa Barbara Research Center. Electrical and optical properties of infrared photodiodes using the InAs/Ga12xInxSb Superlattice in Heterojunctions with GaSb *J. Appl. Phys. 80(2)*, Jul. 15, 1996 0021-8979/96/80(2)/1116/12/$10.00.

Smith, D.L., of The Los Alamos National Laoratory, & Maihiot, C.of The Xerox Webster Research, Webster, NY. Proposal for Strained Type II Superlattice Infrared Detectors *J. Appl. Phys. 62(6)*, Sep. 15, 1987 0021-8979/87/182545-04.

Zheng, L., & Tidrow, M. Z., & Novello, A., & Weichel, H., Vohra, S. Type II Strained Layer Superlattice: A Potential Infrared Sensor Material for Space. *Quantum Sensing and Nanophotonic Devices V, edited by Rengarajan Sudharsanan, Christopher Jelen. Proc. of SPIE* vol. 6900, 69000F, (2008) • 0277-786X/08 • doi: 10.1117/12.768420.

Tennant, W.E., & Lee, Donald, & Zandian, Majid, & Piquett Eric, & Carmody, Michael Of Teledyne Imaging Sensors. MBE HgCdTe Technology—A Very General Solution to IR Detection, Described by "Rule 07", a Very Convenient Heuristic, 2006.

Kavusi et al., "Wuantitative Study of High Dynamic Range Sigma Delta-based Focal Plane Array Architectures", Department of Electrical Engineering, Stanford University, Stanford, CA 94305, Infrared Technology and Applications XXX, edited by Bjorn F. Andresen, Gabor F. Fulop, Proc. Of SPIE vol. 5406 (SPIE, Bellingham, WA, 2004) 0277-786X/04/$15—doi: 10.1117/12.548875, 10 pages.

Mendis et al., "Design of a Low-Light-Level Image Sensor with On-Chip Sigma-Delta Analog-to-Digital Conversion", 0-8194-1133-7/93/$6.00; SPIE vol. 1900, 9 pages. (c) 1993: SPIE—The International Society for Optical Engineering.

* cited by examiner

| 1,1 | 1,2 | 1,3 | | | | | 1,30 | 1,31 | 1,32 |
|---|---|---|---|---|---|---|---|---|---|
| 2,1 | 2,2 | 2,3 | | | | | 2,30 | 2,31 | 2,32 |
| 3,1 | | | | | | | | | 3,32 |
| | | | | | | | | | |
| | | | | | | | | | |
| | | | | | | | | | |
| | | | | | | | | | |
| | | | | | | | | | |
| | | | | | | | | | |
| | | | | | | | | | |
| 126,1 | | | | | | | | | 126,32 |
| 127,1 | 127,2 | 127,3 | | | | | 127,30 | 127,31 | 127,32 |
| 128,1 | 128,2 | 128,3 | | | | | 128,30 | 128,31 | 128,32 |

METHOD 3
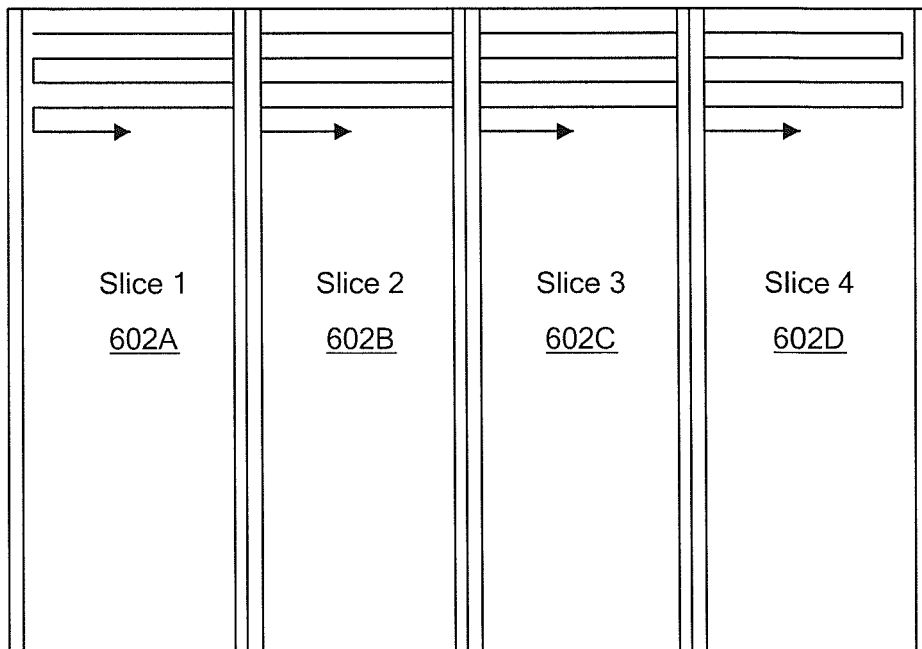
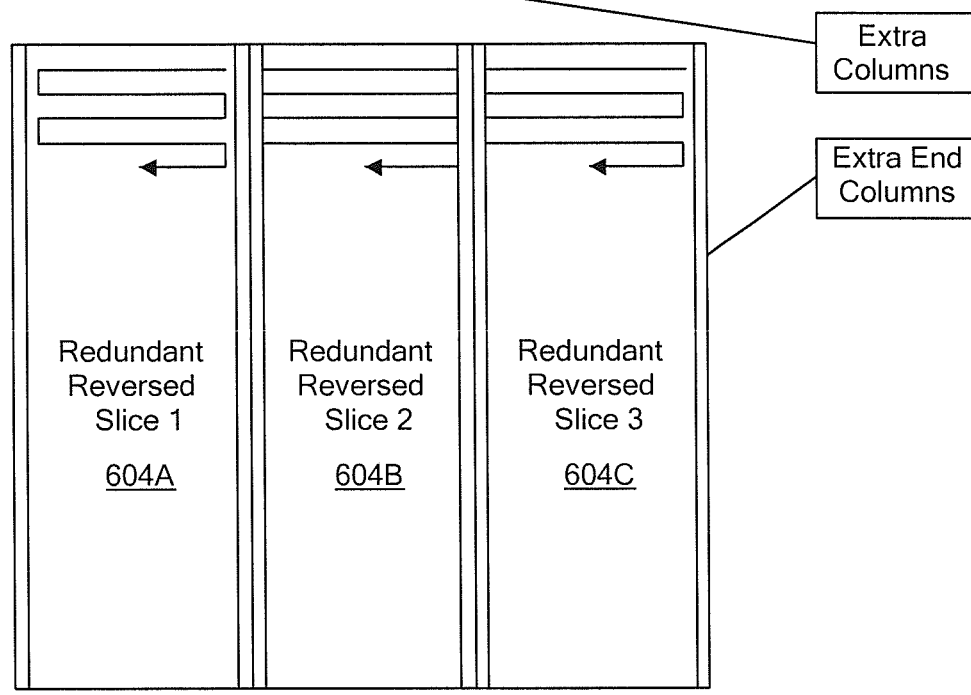
FIG. 8

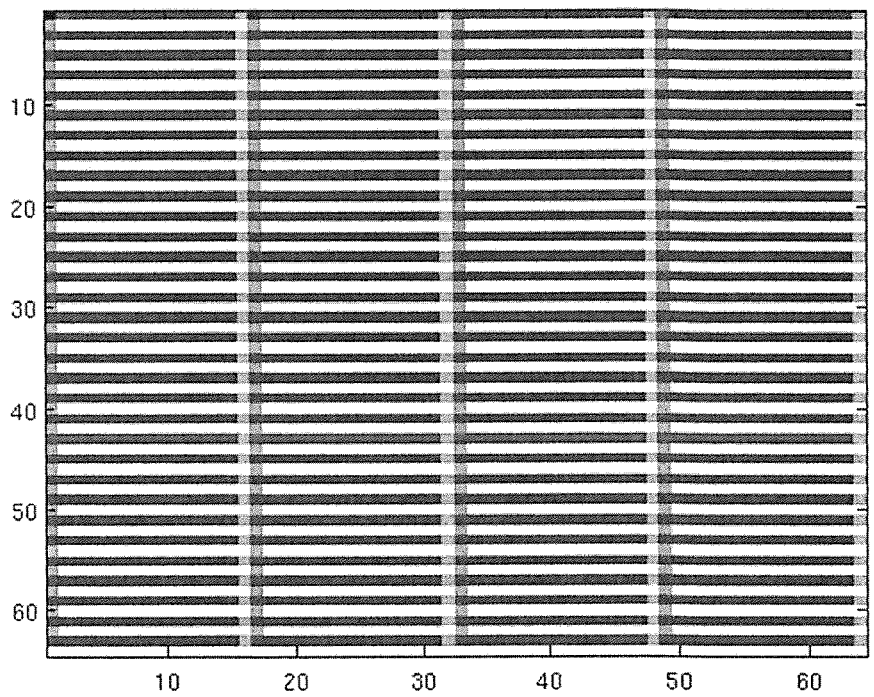
900 — FIG. 9
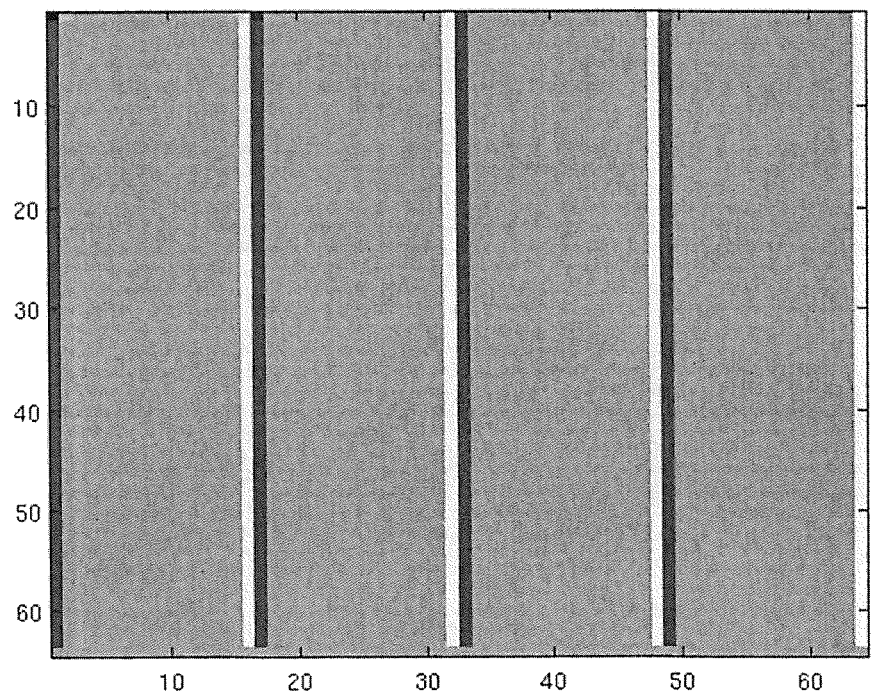
1000 — FIG. 10

2100

2200

2500

2600

2900

3000

3100

3200

Appendix A -MATLAB CALLING DESCRIPTION

Function Call Script

```
src2D=gen_image('IM');
nslc=4;
[nrow,ncol]=size(src2D);
[slice,redun]=slice_image(src2D,nslc);
global pstream rstream dec_stream rdn_stream Tpix Tsim;
Tpix=1e-6; Tsim=Tpix*(nrow+1)*ncol;
[pstream,rstream]=stream_redun(slice,redun,Tpix);
sim('snake_eye_GMP.mdl');
[proic,rroic]=destream_redun(dec_stream.data,rdn_stream,ncol/nslc+2,10);
roic1=deslice_img(proic(1:nrow,:,:));  roic2=deslice_img(rroic(1:nrow,:,:));
cps2=(ncol/nslc)/2;
dst2D=[roic1(:,1:cps2),(roic1(:,cps2+1:ncol-cps2)+roic2(:,:))/2,roic1(:,ncol-cps2+1:end)];
figure(101); imagesc(dst2D,[-1 1]); colormap(gray); title('ROIC Processed Image');
figure(102); imagesc(src2D-dst2D,[-1 1]); colormap(gray); title('Error Image');
figure(103); imagesc(src2D-dst2D); colormap(gray); title('GAINED Error');
rms(src2D-dst2D) function [src2D]=gen_image(tst_image)
``` src2D=gen_image('IM');

Function Inputs: (HG, VG, HS, VS, IM)   =>   test_image

Function Outputs:   src2D   <=   src2D

This function generates the test images. The images choices are
HG: Horizontal gradient varying from -1 to + 1 in equal steps from left to right.
VG: Vertical gradient varying from -1 to + 1 in equal steps from top to bottom
HS: Horizontal Strips with 8 columns of "-1", 96 columns of "+1", 16 columns of "-1" and 8 columns of "+1" from left to right.
VS: Vertical Strips with 8 rows of "-1", 96 rows of "+1", 16 rows of "-1" and 8 rows of "+1" from top to bottom.
IM: An image including a background and two people as an example of a more realistic image.

[slice,redun]=slice_image(src2D,nslc);

Function Inputs:   src2D   =>   test_image
                   nslc    =>   nslice Function Outputs:  slice   <=   slice
                   redun   <=   redun This function pads the image with one extra column at the start and end of the image that are copies of the first and last columns respectively. The test image src2D is passed into the internal variable src, and the number of slices nslc is passed in to the internal variable nslice.
The test image is nrow = 128 and ncol = 128, prior to being padded with an extra column on the left and the right so the SDM ADC has settled by the first valid pixel. Variables ncol and nrow are sized from the original source image. The columns per slice stored in variable cps, is calculated as ncol / nslice = 128/4 = 32.

The image is sliced into an array called slice as follows
    for i = 1 slice(1:128, 1: 32+2, 1) = src(1:128, 1:34)

*FIG. 35A* for i = 2 slice(1:128, 1: 32+2, 2) = src(1:128, 33:66)
for i = 3 slice(1:128, 1: 32+2, 3) = src(1:128, 65:98)
for i = 4 slice(1:128, 1: 32+2, 4 = src(1:128, 97:130)

Note that instead of evenly dividing the columns into 32 wide slices with the ranges 1:32, 33:64, 65:96, 97:128; the slices are padded with an extra column of pixels on the left and the right. For i = 1 this includes the copied first column pixel, and one from the slice to the right. For i = 4 this includes the copied last column pixel plus one from the slice to the left. The extra pixel padding allows the SDM ADC to settle to close to the correct value on the first valid pixel and addresses an image artifact that was shown in interim report 2.

A redundant image slice is created that overlay's two slices and reads out in the opposite serpentine direction from the primary slices. The redundant array does not overlap the left most half slice, or right most half slice of the slice arrays in this report to highlight the image improvement. The benefit of averaging the redundant slices is shown by the artifacts that are seen in the left most half slice and the right most half slice. In a hardware implementation an additional redundant slice would be created and wrap around to include the left most and right most columns of the image The image is sliced into redundant slice arrays called redun as follows
for i = 1 redun(1:128, 1: 32+2, 1) = src(1:128, 17:50)
for i = 2 redun(1:128, 1: 32+2, 2) = src(1:128, 49:82)
for i = 3 redun (1:128, 1: 32+2, 3) = src(1:128, 81:114)
for i = 4 there is no redundant slice for I = 4

The arrays slice and redun are passed back from the function slice_image.

$$[pstream, rstream] = stream\_redun(slice, redun, Tpix);$$

Function Inputs:  slice   =>   slice
                  redun   =>   redun
                  Tpix    =>   ts Function Outputs: pstream <=   pstream
                  rstream <=   rstream This function inputs the slice and redun arrays that hold image slices as well as a variable Tpix passed to variable Ts which is the time increment used for the time series that the data is streamed into.

The data in the slice(1:128, 1:34, 1:4) array is fed serially to the vector stream1 as follows:
stream1(1:4352, 1) = slice(1, 1:34, 1) concat slice(2, 34:1, 1) ... concat slice(127, 1:34, 1) concat slice(128, 34:1, 1)
stream1(1:4352, 2) = slice(1, 1:34, 2) concat slice(2, 34:1, 2) ... concat slice(127, 1:34, 2) concat slice(128, 34:1, 2)
stream1(1:4352, 3) = slice(1, 1:34, 3) concat slice(2, 34:1, 3) ... concat slice(127, 1:34, 3) concat slice(128, 34:1, 3)
stream1(1:4352, 4) = slice(1, 1:34, 4) concat slice(2, 34:1, 4) ... concat slice(127, 1:34, 4) concat slice(128, 34:1, 4)

This means the rows of each slice of four slices are serialized into the four stream1 vectors from left to right on row 1, and then from right to left on row 2, alternating for every other row. This data is demultiplexed in the snake_eye_GMP.mdl Simulink model of the SDM ADC.

In a similar manner, the data in the redun(1:128, 1:34, 1:3) array is fed serially to the vector stream2 as follows:
stream2(1:4352, 1) = redun(1, 1:34, 1) concat redun(2, 34:1, 1) ... concat redun(127, 1:34, 1) concat redun(128, 34:1, 1)

*FIG. 35B* stream2(1:4352, 2) = redun(1, 1:34, 2) concat redun(2, 34:1, 2) ... concat redun(127, 1:34, 2) concat redun(128, 34:1, 2)
stream2(1:4352, 3) = redun(1, 1:34, 3) concat redun(2, 34:1, 3) ... concat redun(127, 1:34, 3) concat redun(128, 34:1, 3)

Note that redun is the overlapping slices, and there are only three slices in this case. "Concat" is short for concatenate.

Finally, the stream1 serialized data is put into pstream (primary stream), a time series, and the stream2 serialized data is put into rstream (redundant stream) a time series. Both time series have time values from 0 us to the product of the total number of pixels and Tpix = 1 us.

Both pstream and rstream are returned from the function.

sim('snake_eye_GMP.mdl')

This is a call to the Simulink snake_eye model. The model uses a "From Workspace" Simulink block to input the pstream and rstream serial data and time. The data is demultiplexed to a SDM ADC per slice. This includes four ADCs for the pstream and three ADCs for the rstream. On the output, the data is multiplexed and output to the workspace with a "To Workspace" Simulink block. The output variables are dec_stream which has the converted pstream, and rdn_stream which has the converted rstream.

function [pslice,rslice]=destream_redun(stream,redun,ncol,offset)

Function Inputs:  dec_stream.data  =>      stream
                  rdn_stream       =>      redun
                  ncol/nslc+2      =>      ncol
                  10               =>      offset Function Outputs: proic            <=      pslice
                  rroic            <=      rslice The purpose of this function is to de-stream the data from the four slices and three redundant slices that were serialized into a stream and processed through the smake_eye_GMP.mdl SDM ADC.

An index is created to step through the stream data to put it back into slices. The variable jj steps by 2 from 1 to the value of (nrow-1).

| jj  | indx=[offset offset-1]+ncol*[jj-1:jj] | | indx=indx+[ncol ncol] | |
| --- | --- | --- | --- | --- |
| 1   | 10   | 43   | 44   | 77   |
| 3   | 78   | 111  | 112  | 145  |
| 5   | 146  | 79   | 180  | 213  |
|     | .    |      |      |      |
|     | .    |      |      |      |
|     | .    |      |      |      |
| 125 | 4226 | 4259 | 4260 | 4293 |
| 127 | 4294 | 4327 | 4328 | 4361 |

Using this index to look at the loop in the function
```
for jj=1:2:nrow-1
    indx=[offset offset-1]+ncol*[jj-1:jj];
    pslice(jj,:,:)=stream(indx(1):indx(2),:);
    rslice(jj,:,:)=redun(indx(2):-1:indx(1),:);
    indx=indx+[ncol ncol];
```

*FIG. 35C*

```
pslice(jj+1,:,:)=stream(indx(2):-1:indx(1),:);
rslice(jj+1,:,:)=redun(indx(1):indx(2),:);
end
```

It can be seen that pslice and rslice first copy 34 values of the stream from left to right, and then copy 34 values from right to left to deserialize the alternating serialization that was performed by the stream_redun function prior to processing the data through the SDM ADC. Note that the function uses the value of "offset" which is a delay to account for the lag time of the SDM ADC.

$$\text{roic1}=\text{deslice\_img}(\text{proic}(1\text{:nrow},:,:)); \quad \text{roic2}=\text{deslice\_img}(\text{rroic}(1\text{:nrow},:,:))$$

| Function Inputs: | proic | => | slice |
| | rroic | => | slice |
| Function Outputs: | roic1 | <= | dst |
| | roic2 | <= | dst |

This is two calls to function deslice_img, one for the primary roic output (proic), and one for the redundant roic output (rroic). The variables nrow, ncol, and nslice are calculated from the input slice data as

```
[nrow,ncol,nslice] = size(slice)
nrow = 128
ncol = 34
nslice = 4 for the proic input and 3 for the rroic input
```

Note that proic and rroic are longer arrays in the row number than the input to SDM ADC (484 x 34 x 4 and 484 x 34 x 4) because SDM ADC runs for longer than required for the amount of image data in this case. The input is reduced to the correct number of rows with the function call by specifying the row index as 1:nrow.

In the case of the primary or proic input to slice the code:
```
for i = 1:nslice
    dst(:,(1+(i-1)*(ncol-2)):i*(ncol-2))=cast(slice(:,2:ncol-1,i),'double');
end
``` casts the data as a "double" and copies slice as follows slice(1:128, 2:33, 1) => dst(1:128, 1:32)
slice(1:128, 2:33, 2) => dst(1:128, 33:64)
slice(1:128, 2:33, 3) => dst(1:128, 65:96)
slice(1:128, 2:33, 4) => dst(1:128, 97:128)

In the case of the redundant or rroic input to slice the code:
```
for i = 1:nslice
    dst(:,(1+(i-1)*(ncol-2)):i*(ncol-2))=cast(slice(:,2:ncol-1,i),'double');
end
``` casts the data as a "double" and copies slice as follows slice(1:128, 2:33, 1) => dst(1:128, 1:32)
slice(1:128, 2:33, 2) => dst(1:128, 33:64)
slice(1:128, 2:33, 3) => dst(1:128, 65:96)

The returned data from the two calls is

*FIG. 35D* roic1(1:128, 1:128)
roic2(1:128,1:128)

dst2D=[roic1(:,1:cps2),(roic1(:,cps2+1:ncol-cps2)+roic2(:,:))/2,roic1(:,ncol-cps2+1:end)]

This statement is in the top level script "ReadOutSerpentineDual.m" rather than a function call, and it averages the primary and redundant images together.

dst2D(1:128, 1:16) = roic1(1:128:, 1:16)
dst2D(1:128, 17:112) = ( roic1(1:128:, 17:112) + roic2(1:128:, 1:96) ) / 2
dst2D(1:128, 113:128) = roic1(1:128:, 113:128)

*FIG. 35E*

Appendix B - MATLAB ROUTINES $$\text{src2D=gen\_image('IM');}$$

Function Inputs: (HG, VG, HS, VS, IM)  =>  test_image

Function Outputs:    src2D    <=    src2D

This function generates the test images. The images choices are
HG: Horizontal gradient varying from -1 to + 1 in equal steps from left to right.
VG: Vertical gradient varying from -1 to + 1 in equal steps from top to bottom
HS: Horizontal Strips with 8 columns of "-1", 96 columns of "+1", 16 columns of "-1" and 8 columns of "+1" from left to right.
VS: Vertical Strips with 8 rows of "-1", 96 rows of "+1", 16 rows of "-1" and 8 rows of "+1" from top to bottom.
IM: An image including a background and two people as an example of a more realistic image.

$$\text{[slice,redun]=slice\_image(src2D,nslc);}$$

Function Inputs: src2D  =>  test_image
                 nslc   =>  nslice

Function Outputs:  slice  <=  slice
                   redun  <=  redun

This function pads the image with one extra column at the start and end of the image that are copies of the first and last columns respectively. The test image src2D is passed into the internal variable src, and the number of slices nslc is passed in to the internal variable nslice.
The test image is nrow = 128 and ncol = 128, prior to being padded with an extra column on the left and the right so the SDM ADC has settled by the first valid pixel. Variables ncol and nrow are sized from the original source image. The columns per slice stored in variable cps, is calculated as ncol / nslice = 128/4 = 32.

The image is sliced into an array called slice as follows
    for i = 1 slice(1:128, 1: 32+2, 1) = src(1:128, 1:34)
    for i = 2 slice(1:128, 1: 32+2, 2) = src(1:128, 33:66)
    for i = 3 slice(1:128, 1: 32+2, 3) = src(1:128, 65:98)
    for i = 4 slice(1:128, 1: 32+2, 4 = src(1:128, 97:130)

Note that instead of evenly dividing the columns into 32 wide slices with the ranges 1:32, 33:64, 65:96, 97:128; the slices are padded with an extra column of pixels on the left and the right. For i = 1 this includes the copied first column pixel, and one from the slice to the right. For i = 4 this includes the copied last column pixel plus one from the slice to the left. The extra pixel padding allows the SDM ADC to settle to close to the correct value on the first valid pixel and addresses an image artifact that was shown in interim report 2.

A redundant image slice is created that overlay's two slices. The redundant array does not overlap the left most half slice, or right most half slice of the slice arrays. The benefit of averaging the redundant slices is shown by the artifacts that are seen in the left most half slice and the right most half slice. The redundant slices are streamed out in the opposite direction than the original slices which improves the overall image quality.

The image is sliced into redundant slice arrays called redun as follows
    for i = 1 redun(1:128, 1: 32+2, 1) = src(1:128, 17:50)
    for i = 2 redun(1:128, 1: 32+2, 2) = src(1:128, 49:82)
    for i = 3 redun (1:128, 1: 32+2, 3) = src(1:128, 81:114)
    for i = 4 there is no redundant slice for I = 4

*FIG. 36A*

The arrays slice and redun are passed back from the function slice_image.

[pstream,rstream]=stream_redun(slice,redun,Tpix);
Function Inputs:  slice   =>   slice
                  redun   =>   redun
                  Tpix    =>   ts Function Outputs:   pstream <=   pstream
                    rstream <=   rstream This function inputs the slice and redun arrays that hold image slices as well as a variable Tpix passed to variable Ts which is the time increment used for the time series that the data is streamed into.

The data in the slice(1:128, 1:34, 1:4) array is fed serially to the vector stream1 as follows:
 stream1(1:4352, 1) = slice(1, 1:34, 1) concat slice(2, 34:1, 1) ... concat slice(127, 1:34, 1) concat slice(128, 34:1, 1)
 stream1(1:4352, 2) = slice(1, 1:34, 2) concat slice(2, 34:1, 2) ... concat slice(127, 1:34, 2) concat slice(128, 34:1, 2)
 stream1(1:4352, 3) = slice(1, 1:34, 3) concat slice(2, 34:1, 3) ... concat slice(127, 1:34, 3) concat slice(128, 34:1, 3)
 stream1(1:4352, 4) = slice(1, 1:34, 4) concat slice(2, 34:1, 4) ... concat slice(127, 1:34, 4) concat slice(128, 34:1, 4)

This means the rows of each slice of four slices are serialized into the four stream1 vectors from left to right on row 1, and then from right to left on row 2, alternating for every other row. This data is demultiplexed in the snake_eye_GMP.mdl Simulink model of the SDM ADC.

In a similar manner, the data in the redun(1:128, 1:34, 1:3) array is fed serially to the vector stream2 as follows:
 stream2(1:4352, 1) = redun(1, 1:34, 1) concat redun(2, 34:1, 1) ... concat redun(127, 1:34, 1) concat redun(128, 34:1, 1)
 stream2(1:4352, 2) = redun(1, 1:34, 2) concat redun(2, 34:1, 2) ... concat redun(127, 1:34, 2) concat redun(128, 34:1, 2)
 stream2(1:4352, 3) = redun(1, 1:34, 3) concat redun(2, 34:1, 3) ... concat redun(127, 1:34, 3) concat redun(128, 34:1, 3)

Note that redun is the overlapping slices, and there are only three slices in this case. "Concat" is short for concatenate.

Finally, the stream1 serialized data is put into pstream (primary stream), a time series, and the stream2 serialized data is put into rstream (redundant stream) a time series. Both time series have time values from 0 us to the product of the total number of pixels and Tpix = 1 us.

Both pstream and rstream are returned from the function.

sim('snake_eye_GMP.mdl')

This is a call to the Simulink snake_eye model. The model uses a "From Workspace" Simulink block to input the pstream and rstream serial data and time. The data is demultiplexed to a SDM ADC per slice. This includes four ADCs for the pstream and three ADCs for the rstream. On the output, the data is multiplexed and output to the workspace with a "To Workspace" Simulink block. The output variables are dec_stream which has the converted pstream, and rdn_stream which has the converted rstream.

*FIG. 36B*

[proic,rroic]=destream_redun(dec_stream.data,rdn_stream,ncol/nslc+2,10)
This function takes the image that has been converted to slices, the slices padded with extra pixels on the right and left, serialized in a manner where odd number rows are output left to right and even rows are output right to left, converted from analog to digital with a SDM ADC, and reconstructs the original slices.

function [pslice,rslice]=destream_redun(stream,redun,ncol,offset)

| Function Inputs: | dec_stream.data | => | stream |
|---|---|---|---|
| | rdn_stream | => | redun |
| | ncol/nslc+2 | => | ncol |
| | 10 | => | offset |
| Function Outputs: | proic | <= | pslice |
| | rroic | <= | rslice |

The purpose of this function is to de-stream the data from the four slices and three redundant slices that were serialized into a stream and processed through the smake_eye_GMP.mdl SDM ADC.

An index is created to step through the stream data to put it back into slices. The variable jj steps by 2 from 1 to the value of (nrow-1).

| jj | indx=[offset offset-1]+ncol*[jj-1:jj] | | indx=indx+[ncol ncol] | |
|---|---|---|---|---|
| 1 | 10 | 43 | 44 | 77 |
| 3 | 78 | 111 | 112 | 145 |
| 5 | 146 | 79 | 180 | 213 |
| . | | | | |
| . | | | | |
| . | | | | |
| 125 | 4226 | 4259 | 4260 | 4293 |
| 127 | 4294 | 4327 | 4328 | 4361 |

Using this index to look at the loop in the function
```
for jj=1:2:nrow-1
    indx=[offset offset-1]+ncol*[jj-1:jj];
    pslice(jj,:,:)=stream(indx(1):indx(2),:);
    rslice(jj,:,:)=redun(indx(2):-1:indx(1),:);
    indx=indx+[ncol ncol];
    pslice(jj+1,:,:)=stream(indx(2):-1:indx(1),:);
    rslice(jj+1,:,:)=redun(indx(1):indx(2),:);
end
```

It can be seen that pslice and rslice first copy 34 values of the stream from left to right, and then copy 34 values from right to left to deserialize the alternating serialization that was performed by the stream_redun function prior to processing the data through the SDM ADC. Note that the function uses the value of "offset" which is a delay to account for the lag time of the SDM ADC.

roic1=deslice_img(proic(1:nrow,:,:));  roic2=deslice_img(rroic(1:nrow,:,:))

| Function Inputs: | proic | => | slice | | |
|---|---|---|---|---|---|
| | rroic | => | slice | | |
| Function Outputs: | roic1 | | | <= | dst |
| roic2 | | | | <= | dst |

*FIG. 36C*

This is two calls to function deslice_img, one for the primary roic output (proic), and one for the redundant roic output (rroic). The variables nrow, ncol, and nslice are calculated from the input slice data as

```
[nrow,ncol,nslice] = size(slice)
nrow = 128
ncol = 34
nslice = 4 for the proic input and 3 for the rroic input
```

Note that proic and rroic are longer arrays in the row number than the input to the SDM ADC (484 x 34 x 4 and 484 x 34 x 4) because SDM ADC runs for longer than required for the amount of image data in this case. The input is reduced to the correct number of rows with the function call by specifying the row index as 1:nrow.

In the case of the primary or proic input to slice the code:
```
for i = 1:nslice
    dst(:,(1+(i-1)*(ncol-2)):i*(ncol-2))=cast(slice(:,2:ncol-1,i),'double');
end
``` casts the data as a "double" and copies slice as follows

```
slice(1:128, 2:33, 1) => dst(1:128, 1:32)
slice(1:128, 2:33, 2) => dst(1:128, 33:64)
slice(1:128, 2:33, 3) => dst(1:128, 65:96)
slice(1:128, 2:33, 4) => dst(1:128, 97:128)
```

In the case of the redundant or rroic input to slice the code:
```
for i = 1:nslice
    dst(:,(1+(i-1)*(ncol-2)):i*(ncol-2))=cast(slice(:,2:ncol-1,i),'double');
end
``` casts the data as a "double" and copies slice as follows

```
slice(1:128, 2:33, 1) => dst(1:128, 1:32)
slice(1:128, 2:33, 2) => dst(1:128, 33:64)
slice(1:128, 2:33, 3) => dst(1:128, 65:96)
```

The returned data from the two calls is

```
roic1(1:128, 1:128)
roic2(1:128,1:128)
```

```
dst2D=[roic1(:,1:cps2),(roic1(:,cps2+1:ncol-cps2)+roic2(:,:))/2,roic1(:,ncol-cps2+1:end)]
```

This statement is in the top level script "ReadOutSerpentineDual.m" rather than a function call, and it averages the primary and redundant images together.

```
dst2D(1:128, 1:16) = roic1(1:128:, 1:16)
dst2D(1:128, 17:112) = ( roic1(1:128:, 17:112) + roic2(1:128:, 1:96) ) / 2
dst2D(1:128, 113:128) = roic1(1:128:, 113:128)
deslice_img.m
function [dst]=deslice_img(slice)
%Reconstruct image from slices of image
[nrow,ncol,nslice] = size(slice);
for i = 1:nslice
%   dst(1:2:nrow,(1+(i-1)*ncol):i*ncol)=slice(1:2:nrow,1:ncol,i);
```

*FIG. 36D*

```
%   dst(2:2:nrow,i*ncol:-1:(1+(i-1)*ncol))=slice(2:2:nrow,1:ncol,i);
    dst(:,(1+(i-1)*(ncol-2)):i*(ncol-2))=cast(slice(:,2:ncol-1,i),'double');
end
figure(101); imagesc(dst,[-1 1]); colormap(gray); title('ROIC Processed Image');
end
```

ReadOutSerpentineDual.m

```
src2D=gen_image('HG');
nslc=4;
[nrow,ncol]=size(src2D);
[slice,redun]=slice_image(src2D,nslc);
global pstream rstream dec_stream rdn_stream Tpix Tsim;
Tpix=1e-6; Tsim=Tpix*(nrow+1)*ncol;
[pstream,rstream]=stream_redun(slice,redun,Tpix);
sim('snake_eye_GMP.mdl');
[proic,rroic]=destream_redun(dec_stream.data,rdn_stream,ncol/nslc+2,10);
roic1=deslice_img(proic(1:nrow,:,:));  roic2=deslice_img(rroic(1:nrow,:,:));
cps2=(ncol/nslc)/2;
dst2D=[roic1(:,1:cps2),(roic1(:,cps2+1:ncol-cps2)+roic2(:,:))/2,roic1(:,ncol-cps2+1:end)];
figure(101); imagesc(dst2D,[-1 1]); colormap(gray); title('ROIC Processed Image');
figure(102); imagesc(src2D-dst2D,[-1 1]); colormap(gray); title('Error Image');
figure(103); imagesc(src2D-dst2D); colormap(gray); title('GAINED Error');
rms(src2D-dst2D)
``` slice_image.m

```
function [slice,redun]=slice_image(src,nslice)
%Readin and Parse Image into slices
[nrow,ncol] = size(src);
src=[src(:,1),src(:,:),src(:,end)];
cps = round(ncol/nslice); %Number of Columns per Slicefigure
for i = 1:nslice-1
    slice(1:nrow,1:cps+2,i) = src(:,(1+(i-1)*cps):i*cps+2);
    redun(1:nrow,1:cps+2,i) = src(:,(1+(i-0.5)*cps):(i+0.5)*cps+2);
%   figure, imagesc(slice(:,:,i),[-1 1]), colormap(gray);
%   figure, imagesc(redun(:,:,i),[-1 1]), colormap(gray);
end
    i=nslice;
    slice(1:nrow,1:cps+2,i) = src(:,(1+(i-1)*cps):i*cps+2);
end
``` stream_redun.m

```
function [pstream,rstream]=stream_redun(slice,redun,ts)
%Readin a slice and create stream of pixel values per slice
[nrow,ncol,nslc] = size(slice);
stream1=[]; stream2=[];
substream1=zeros(ncol,nslc);
substream2=zeros(ncol,nslc-1);
for jj=1:2:nrow
    substream1(:,:)=slice(jj,:,:);
    stream1=[stream1; substream1];
    substream1(:,:)=slice(jj+1,end:-1:1,:);
    stream1=[stream1; substream1];
```

*FIG. 36E*

```
    substream2(:,:)=redun(jj,end:-1:1,:);
    stream2=[stream2; substream2];
    substream2(:,:)=redun(jj+1,:,:);
    stream2=[stream2; substream2];
end
%strm=cast(stream(:,:).*2^14,'int16');
pstream=timeseries(stream1,linspace(0,nrow*ncol*ts,nrow*ncol)','NAME','Streamed_Sliced_Img');
rstream=timeseries(stream2,linspace(0,nrow*ncol*ts,nrow*ncol)','NAME','Streamed_Sliced_Img');
end
``` destream_redun .m

```
function [pslice,rslice]=destream_redun(stream,redun,ncol,offset)
%Readin a slice and create stream of pixel values per slice
[npix,nslc] = size(stream);
nrow=npix/ncol;
for jj=1:2:nrow-1
   indx=[offset offset-1]+ncol*[jj-1:jj];
   pslice(jj,:,:)=stream(indx(1):indx(2),:);
   rslice(jj,:,:)=redun(indx(2):-1:indx(1),:);
   indx=indx+[ncol ncol];
   pslice(jj+1,:,:)=stream(indx(2):-1:indx(1),:);
   rslice(jj+1,:,:)=redun(indx(1):indx(2),:);
end
end
```

*FIG. 36F*

IMAGER READOUT ARCHITECTURE UTILIZING A/D CONVERTERS (ADC)

CROSS REFERENCE TO RELATED APPLICATIONS

This application claims priority to Provisional Patent Application No. 61/446,582, filed Feb. 25, 2011, entitled "Imager Readout Architecture Utilizing A/D Converters (ADC)," inventor Eugene M. Petilli, the contents of which are hereby incorporated by reference.

FIELD OF THE INVENTION

The invention is related to a unique approach to developing a read out integrated circuit (ROIC) for that is broadly applicable to digitization of focal plane imager arrays, including but not limited to strained layer superlattice imagers (SLS), using sigma delta modulator (SDM) based analog to digital converters (SDM ADC). This invention is further related to design of application specific integrated circuits (ASICs) to implement ROICs.

BACKGROUND

Superlattice (SLC) structures are formed by selective deposition of thin layers of different semiconductor materials one above the other in a stacked arrangement to create a plurality of heterojunctions in the vertical or stacking direction. Electrical conduction will take place through the superlattice structure when trapped carriers absorb sufficient energy to escape the energy wells created at the interlayer junctions. If a transparent radiation window is provided for admitting photons into the junctions, a photosensitive superlattice structure can be fabricated for detecting photons having energy levels or frequencies above that of the energy band difference at the superlattice layer junctions. The energy band difference of the superlattice depends on the semiconductor materials selected to form each of its plural heterojunctions. Wavelength sensitivity can be established by selecting the semiconductor materials of each layer according to known energy band characteristics to create a desired energy level difference at the interlayer junctions.

One advantage of superlattice (SLS) sensors is that they can be tuned to specific infrared (IR) wavelengths by engineering the band structure. The high degree of wavelength tuneability supports operation at wavelengths that are not well supported by other IR sensor technologies. The SLS has a stack of wavelength tuned strained layers acting as pn junctions, and with proper electronic biasing the SLS can switch the sensitivity between two wavelengths. In addition to the benefits outlined above, that are a function of band structure, engineering SLS sensors show promise in the reduction of Auger currents.

Read out integrated circuit (ROIC) designs are constrained by the SLS sensors. The SLS sensors constrain the design of a ROIC in the following areas:
Pixel pitch/size
Imager/ROIC dimensions
ROIC well capacity
Signal to Noise Ratio (SNR) and resolution
Integration time/frame rate
Bias voltage requirements
SLS to ROIC mechanical interface
Operating Temperature The wavelength of imaged light and the limitations of the optics govern the range of pixel size. IR imaging is usually done in the medium wavelength infrared (MWIR) 2-5 μm to 8-10 μm bands. Pixel size is limited by the Airy disc, which defines the smallest spot that can be focused by an optical system with a circular aperture. For MWIR at 2 μm wavelength with an f/4 optical system.

$$PITCHmin = 1.22 \times \lambda \times (f/\#) = 1.22 \times 2 \text{ um} \times 4 = 9.75 \text{ μm}$$

SLS imagers are operating in the 5 μm to 14.5 μm wavelength range, which would set a minimum pixel size at about 25 um. The standard for SLS pixel size at the present time is about 30 μm, with some work being done in the 15 μm range.

Typically the pixel pitch determines the pixel size. At this time SLS imager pixel pitches are on the order of 30 μm, and this provides adequate area to design ROIC electronics to fit within the sensor footprint.

Many present SLS sensors have a size of 256×256 or 256×320 pixels. It is expected that in the near term the size will increase to 512×512 pixels as the SLS fabrication process improves. Long term expectations are for 1024×1024 pixel imagers.

SLS imagers typically have frame rates in the 30-60 Hz range. The frame rate and imager size determines the readout rate. SDM ADCs over sample the signal so that the maximum clock frequency is a product of the readout rate and the over sampling rate (OSR). For example, a 60 Hz frame rate for a 256×320 imager which is sliced into 64 pixel wide sections, with an oversampling ratio (OSR) of 64 would have a maximum sample clock frequency of:

$$(64 \text{ columns} \times 256 \text{ rows}) \times (60 \text{ fps}) \times (64 \text{ samples per pixel}) = 63 \text{ MHz}.$$

This is easily within the range of current complementary metal oxide semiconductor (CMOS) design technologies. As the technology scales up to 1024×1024 imagers with readouts of 100 frames per second, CMOS will still be able to provide a ROIC solution but will require migration to deep submicron processes that can support high data rates. For example, a 100 Hz frame rate for a 1024×1024 imager which is sliced into 64 pixel wide sections, with an OSR of 64 would have a maximum sample clock frequency of:

$$(64 \text{ columns} \times 1024 \text{ rows}) \times (100 \text{ fps}) \times (64 \text{ samples per pixel}) = 420 \text{ MHz}.$$

SLS imagers have lower Auger currents, but the state of the art at the present in SLS has higher dark currents than mercury cadmium telluride (HgCdTe) (MCT) IR imagers.

The SLS sensor element is a reversed biased pn junction photodiode. The output is a current and there is no inherent storage or integration of that current on the SLS sensor. This requires that the ROIC provide a capacitor and electronics to integrate and measure the total current output in a readout period. An average current output for the SLS reverse biased diode is 11 nA at a temperature of 85 K. The noise is the combination of sensor noise sources:
Auger Currents
Dark Current
Shot Noise
Detector 1/f noise and system noise sources:
Quantization Noise
Capacitor thermal noise (kTC Noise) from the integrating capacitor
Preamplifier 1/f Noise
Electrical noise The system noise is under control of the ROIC. With a SDM ADC, the OSR can be increased to reduce quantization noise, and it is possible to get 12-14 bit resolution. Shot noise is inherent to the sensor and IR source, and 1/f noise is inherent to both the sensor and electronics. The ratio of the signal and the sum of the various noise sources determine the signal to noise ratio (SNR). In general, the SNR improves with longer integration times. The integration time is a function of the capacity for charge storage in a pixel. For example, in a ROTC scheme that Lincoln Labs uses, the charge is reset after reaching a threshold which is equivalent to unlimited storage. In a ROIC with a single non-reset storage capacitor 20-50 million electrons of stored charge is a good goal. The maximum number of electrons stored is a common figure of merit for ROICs.

As mentioned above, the SLS imager requires biasing of the active imaging pn junction in each pixel. The bias can be externally supplied or the ROIC can provide biasing. The bias is on the order of 250-500 mV. SLS imagers can have several layers of pn junctions that are optically tuned to different wavelengths. By biasing the pn junction of interest in the reverse direction, the diode output and wavelength can be selected to be integrated and converted to a digital output. The ROIC should be able to detect the bias if it is externally provided and configure to operate with that bias, or alternatively generate a selectable bias.

The mechanical interface between the SLS and the ROIC has to adjust to the different coefficients of thermal expansion of the two materials. This may require an interface layer called a thermal expansion pedestal and wafer thinning as is done with MCT imagers.

The operating temperature of IR imagers requires the kT/q electron energy to be much less than the bandgap between the top of the valence band and the bottom of the conduction band. This is necessary to reduce thermal noise generated by electrons. SLS imagers typically operate in the 70 K-80 K range to reduce thermal noise.

SUMMARY OF THE INVENTION

The following presents a simplified summary in order to provide a basic understanding of one or more aspects of the invention. This summary is not an extensive overview of the invention, and is neither intended to identify key or critical elements of the invention, nor to delineate the scope thereof Rather, the primary purpose of the summary is to present some concepts of the invention in a simplified form as a prelude to the more detailed description that is presented later.

The inventor of the instant invention has investigated a unique approach to developing a read out integrated circuit (ROIC) for strained layer superlattice imagers (SLS) using sigma delta modulator (SDM) based analog to digital converters (SDM ADC). This investigation is further related to the design of application specific integrated circuits (ASICs) to implement ROICs. In addition, the unique approaches discussed herein are applicable where the ROIC is configured as part of a focal plane imager array, or a Back Side Illuminated CMOS (BSI-CMOS), or a Quantum Well Infrared Photodetector (QWIP), or a Corrugated QWIP.

In one embodiment, the invention demonstrates (as discussed further herein) that an SDM ADC can applied to a ROIC designed for an SLS imager (as well as other types of imagers, as noted above). SDM ADCs have advantages of being high resolution, low power, and having repeatable performance that does not depend on matching of components. While SDM ADCs have become the standard converter in the audio applications, they have not typically been applied to imaging applications. By recognizing and using the spatial frequency bandwidth limit of optical systems, and the subsequent temporal band limit, the embodiments of the invention provide a read out method that overcomes the primary limitation of the SDM ADC. This read out method digitizes the output of adjacent pixels in a serpentine sequence and on boundaries created buffer pixels.

THE CLAIMS WILL BE PARAPHRASED PENDING THEIR APPROVAL

Details relating to these and other embodiments of the invention are described more fully herein.

BRIEF DESCRIPTION OF THE FIGURES

The advantages and aspects of the present invention will be more fully understood in conjunction with the following detailed description and accompanying drawings, in which:

FIG. 5 is an illustrative example of Slice Indexing for a 128×128 Test Image, in accordance with one embodiment of the invention;

FIG. 8 is an illustrative example of Method 3—Three overlapping opposite serpentine redundant slices averaged in, in accordance with one embodiment of the invention;

FIG. 9 in an illustrative grayscale image showing a Gained Error Image of Horizontal Gradient using method 1, in accordance with one embodiment of the invention;

FIG. 10 is an illustrative grayscale image showing a Gained Error Image of Horizontal Gradient using method 2, in accordance with one embodiment of the invention;

FIGS. 35A-35E are a first MATLAB listing of a MATLAB calling description used to validate at least some embodiments of the invention; and FIGS. 36A-36F are a second MATLAB listing of MATLAB routines used with the MATLAB calling description of FIGS. 35A-35E.

The drawings are not to scale, emphasis instead being on illustrating the principles of the invention. In addition, in the drawings, like reference numbers indicate like elements.

DETAILED DESCRIPTION OF THE INVENTION

Figure 1:
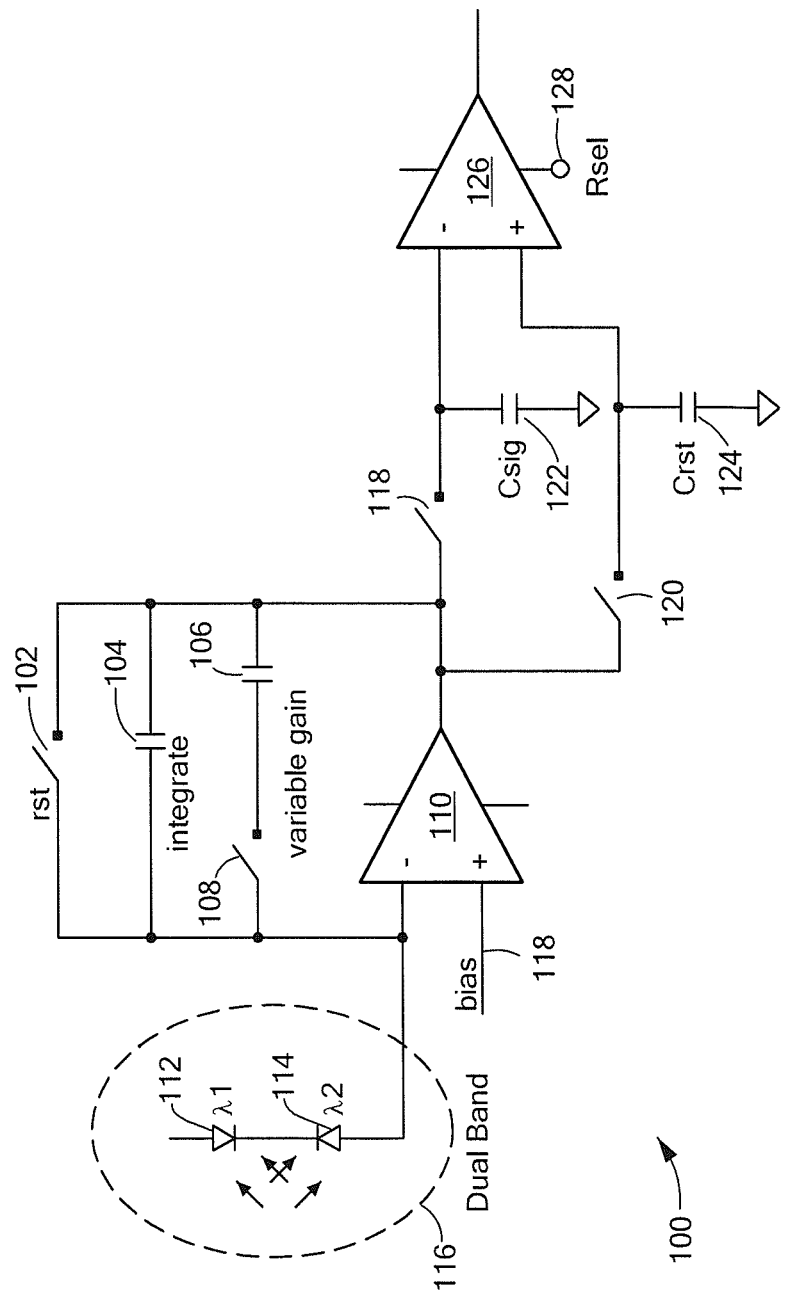
FIG. 1 is a schematic block diagram of an illustrative capacitive trans-impedance amplifier (CTIA) for dual band readout, in accordance with one embodiment of the invention.

The following detailed description of the invention provides illustrative examples. Although the embodiments of the invention are discussed in connection with exemplary embodiments using SLS imagers, those of skill in the art will appreciate that the embodiments described herein are broadly applicable to digitization of focal plane imager arrays, as well as other types of imagers and other types of diode arrays.

Note that the following acronyms, abbreviations, and symbols, known to those of skill in the art, are used in the description that follows:

ADC Analog to digital converter
APS Active pixel sensor
ASIC Application Specific Integrated Circuit
CCD Charge coupled device
CIC Cascaded Integrator Comb
CMOS Complementary metal oxide semiconductor
CTIA Charge trans-impedance amplifier
DFP Digital focal plane
ENOB Effective number of bits
FIR Finite impulse response
FPS Frames per second
IC Integrated Circuit
IR Infrared
MCT Mercury cadmium telluride
MIM Metal insulator metal
OSR Oversampling ratio
PFM Pulse frequency modulated
ROIC Read Out IC
SDM Sigma delta modulator
SDM ADC Sigma delta modulator analog to digital converter
SNDR Signal to noise and distortion ratio
SNR Signal to noise ratio
SLS Strained layer superlattice
TIA Trans-impedance amplifier SLS imagers have relatively large pixels compared to current Charge Coupled Devices (CCD) and CMOS imagers. The large pixel size allows the use of a modern process with high density capacitors for charge storage. SLS imagers also require low noise operations in cryogenic temperatures as low as 70 K. Possible solutions to this range from an ADC per pixel, to a single ADC used at the output as commonly used in CCD applications. Because the SLS imager is used in heat sensing IR applications, it is critical that the SLS has a ROIC that is lower power, and therefore has low emissivity in the IR region of interest. Based upon the understanding of the state of the art in SLS ROICs, embodiments of the invention are provided and described herein for an ROIC with a small number of primary and secondary SDM ADCs that operate on slices of the image, and the use of a multiplexer to implement the serpentine readout to each SDM ADC.

In a further embodiment, the response of the SDM ADC to a series of test images is simulated, to identify SDM ADC specific image reconstruction artifacts, and then to address those artifacts by modifying the serpentine read out methodology. For example, in one embodiment, primary and redundant slices are used with the serpentine read out in opposite directions, in conjunction with averaging of the slices. The final images that are run through the MATLAB/SIMULINK test bench demonstrate dramatic improvements in the reduction of SDM ADC artifacts.

In an additional embodiment, the invention includes the design of the electronics for a pixel. The design of the electronics addresses the imager size, frames per second, Effective Number of Bits, sense amplifier power, SDM ADC power, total power per bit, and total power. The electronics for a single pixel and the multiplexor for a row were designed in the Cadence design environment using a non-cryogenic, but representative, 0.18 micron process. A rough placement of the devices was done to estimate the size the pixel electronics.

The circuit design and the floor plan shown herein demonstrate that the design will fit in the target pixel pitch.

At least one embodiment of the invention includes the use of an SDM ADC to read out image data. Because SDM ADC's perform best with a bandwidth limited input signal, a serpentine readout is used to sample and convert adjacent pixels which are limited in signal bandwidth as a result of the spatial bandwidth limitations of the imaging optics. SDM ADCs achieve high resolution by oversampling the data and shaping the noise to push quantization errors to an out of band frequency where they are filtered. They are largely based upon digital logic and reduce or eliminate the need to have highly matched components in the analog design.

In one embodiment, a Matlab/Simulink model of the imaging electronics was used to process a set of test images and demonstrate the operation of one or more embodiments of the invention. A unique readout method divides the image into slices and employs a serpentine readout for each slice. In one embodiment, an inventive process reads odd rows from left to right and even rows from right to left starting at the top and reading down in a serpentine pattern. Two types of image artifacts are identified with this approach: first, errors between adjacent rows, and second errors on the borders of the image slices. This process is discussed herein in connection with "Method 1".

In a further embodiment, a refinement to the serpentine readout uses redundant image slices that overlap the original slices and are read out in the opposite serpentine direction. This approach reduces the image artifacts to be at or below the visual threshold of perception. This process is discussed herein in connection with "Method 2".

In still another embodiment, the Matlab model is used to divide the images into slices, and stream out the pixels in the serpentine pattern. Simulink models the SDM ADCs that process the serialized image data. A sigma delta analog to digital converter uses sigma delta modulation followed by a decimation filter to recover the data. That "converted" image data is then saved from Simulink to the Matlab work space, where Matlab is used to first reconstruct the image slices from the streamed and converted data, and then to average the slices and reconstruct the image. Matlab also generated images of the difference between the original image and the converted and reconstructed image that provide a visual representation of the reconstructed image error.

The electronics to read out a pixel, as well as the electronics, are designed to multiplex each pixel in a row to a sigma delta converter to realize a serpentine read out to a SDM ADC. Analog to digital conversion schemes usable with the embodiments of the invention range from an ADC per pixel, to a single ADC for the whole image array. The larger the number of ADCs, the faster the conversion of the whole image place can take place, but at the cost of power consumption and matching errors between ADCs. A single ADC as is traditionally used in charge coupled device (CCD) imagers limits the read out speed, but has no matching errors. In one embodiment, the invention provides a unique readout method and apparatus that is designed to get the best performance out of SDM ADCs. The architecture of this embodiment places a small number of SDM ADCs outside of the active imaging area or pixels and uses a low power and space efficient multiplexor to implement a serpentine readout to the SDM ADC for an image slice. Because SDM ADCs are primarily digital in nature, the matching is better than other types of ADCs. Since there are a small number of SDM ADCs the overall power requirements are much lower than for example an ADC per pixel.

In one embodiment, the invention uses a Trans-Impedance Amplifier (TIA) for each pixel, which can require a significant amount of power (e.g., on the order of at about 6 uA per TIA). If this power is too much for the application, to meet lower power goals the architecture is modified to have a multiplexer in each row of each slice to reuse the TIA and reduce power.

As the disclosure and simulations discussed herein explain, an ROIC using SDM ADC is an excellent solution to the creation of a highly configurable, repeatable, low power readout specifically targeted towards SLS imagers. SDM ADCs have had great commercial success in many applications but have not been applied to imaging. The development of the embodiments of the invention included simulating an SDM ADC in an imaging application, identifying several imaging specific issues, and demonstrating a solution for each of those issues. The feasibility of the approach has been validated sufficiently enough to create a demonstration ROIC and perform limited testing.

As at least some embodiments of the invention demonstrate, superlattice (SLS) imagers can be tuned to specific infrared (IR) bands by controlling the strained layers, and offer the capability to have dual read outs in different IR bands selectable by the bias voltages. Another unique advantage of at least some of the embodiments of the invention described herein is the serpentine readout that allows a band limited SDM to multiplex between multiple columns by avoiding the discontinuities at the edges of the row. The read out integrated circuits (ROICs) for SLS imagers have been developed in connection with previous IR imager technologies that may not be optimal for SLS imagers. Thus, at least one goal of the instant invention is the creation of a new type of ROIC that is applicable to SLS imagers and uses innovative technology to read out the SLS imager. Embodiments of the invention utilizing this technology are applicable to IR imaging, ROICs, SLS image sensors, and a broad range of space or tactical imaging applications, including but not limited to active CMOS imagers in most commercial cameras available today, as well as to focal plane imager arrays, Back Side Illuminated CMOS (BSI-CMOS), Quantum Well Infrared Photodetector (QWIP), and Corrugated QWIP.

ROIC Architecture

Traditionally, the pixel size of a visible imager (CCD or APS) needs to be minimized to a few microns per side to enable multi megapixel imagers to be fabricated. This necessitates pixel designs of four to seven transistors as well as utilization of the diffusion of the reverse biased photo diode as the integrating capacitor. Using the photodiode as a capacitor has several challenges including:
- capacitance is non-linear with reverse voltage (bias changes with scene intensity),
- saturation of a photodiode dumps substrate current causing "blooming" to adjacent pixels,
- limited gain to establish an optimal noise figure or to buffer signal onto column readout transmission lines.
- Limited pixel area has also led ADCs to be outside the active imaging area and a row-column readout structure is commonly employed (much like a memory chip). Some visible imagers use one or two ADCs for the whole field while others employ one ADC per column.

Since the pixel pitch for SLS is driven by the wavelength of IR light to tens of microns per side and the photodiodes are on a separate substrate from the pixel sense amplifiers, more silicon area is available for circuitry. The large pixel provides an opportunity for a radically higher performance design. Some SLS ROIC designs have used this silicon area to include an ADC per pixel. However, using an ADC per pixel often creates objectionable "fixed pattern noise" due to differences in the ADCs and drives power consumption up considerably. Some SLS ROTC designs use Direct Injection (DI) with a pulse frequency modulated (PFM) ADC per pixel to improve the dynamic range and power, often with no analog amplifiers to impart gain to the signal and no precision reference for the ADC conversion. DI with PFM analog to digital conversion requires digital filtering—often necessitating a second companion digital chip.

Optimal image quality is achieved using a short, full frame, electronic shutter to sample the scene. Lack of a global shutter introduces smearing between frames and blurring of moving objects. Some ROICs control exposure using a "rolling shutter" which can cause tearing of the image due to differences in when the row was sampled. Pulse Frequency Modulated (PFM) ROICs subtract a constant charge per clock which tightly ties integration time to resolution. Other ROICs attempt to reduce noise by averaging frames which implies that there is no frame wide shutter to start or end the frame.

The Digital Focal Plane (DFP) ROIC, in accordance with at least one embodiment of the invention, uses a hybrid approach where high performance sense amplifiers are built in the image field under the pixels and a few "slice" ADCs are located just outside the image field. Use of an analog low noise amplifier to gain the signal close to the photo diodes and establish a low noise figure is critical for low light performance. Each slice is composed of 64 columns which are multiplexed into a low power, high dynamic range Sigma-Delta-Modulator ADC. Row select logic selects the row in the field which is being read out and the 64 pixels from the row are read out and digitized using a serpentine sequence. The SDM ADCs are oversampled data converters and do require digital decimation filtering. However since only one row is operated on at a time, a raster buffer is required (as opposed to a frame buffer for per pixel ADC ROICs) which is easily located outside the image field with the SDMs.

Most high performance photodiode sense amplifiers utilize a Trans-Impedance Amplifier (TIA) to convert input current to voltage. A TIA maintains a constant bias across the photodiode and optimizes the minimum detectable signal. In one embodiment, by replacing the typical resistor feedback with a capacitor 106 (as shown in FIG. 1, which is a schematic block diagram of an illustrative capacitive trans-impedance amplifier (CTIA) for dual band readout, in accordance with one embodiment of the invention), the invention provides a CTIA 100 which integrates the current from the photodiode and converts it to a voltage. Modern IC processing technologies allow for MIM capacitors which are highly linear and high density (1 ff/um$^2$ to 5.6 ff/um$^2$). Adding a reset FET 102 across the integrating capacitor 104 allows all pixels to start integration at the same time, which is required for a global shutter.

Simulations of the CTIA of FIG. 1 were run to validate the design in the Taiwan Semiconductor Manufacturing Company, LTD (TSMC) 180 nanometer (nm) process (available from Taiwan Semiconductor Manufacturing Company of Taiwan, Republic of China). In one embodiment, the design of FIG. 1 was implemented in accordance with a Cryogenic modeled process such as TowerJazz CA13 (available from Tower Semiconductor/TowerJazz of Israel). The design of at least one embodiment of the circuit 100 of FIG. 1 replaces the bias input 188 with the threshold voltage of a NMOS transistor to simplify layout.

Power Estimate:

Each TIA consumes about 6 uA which, depending on the application, might be too high to use per pixel. To reduce power consumption, the 64 to 1 analog mux per slice is moved up into the field as a per slice per row analog mux. This enables time slicing of one TIA for 64 pixels giving a power of <0.1 uA per pixel or ~100 mW for a 1 k×1 k imager during integration. The DFP SDM ADCs, in accordance with at least one embodiment of the invention, enable in system programmable power vs. SNDR tradeoff capability. For a 1 k×1 k imager, when set to 14 bit mode of operation and 60 frames/sec, the SDMs consume ~650 mW. Assuming that the system is simultaneously capturing a new frame while digitizing a previous frame, the total power for a 1 k×1 k imager at 60 FPS is less than about 0.75 Watts. Table 1, below shows estimates of total power versus system Parameters.

TABLE 1

Total power estimates versus system paramters.

| Imager Size | FPS (Frames Per Second) | ENOB (Effective Number of Bits) | Sense Amp Power | SDM ADC Power | Power per Bit | Total Power |
|---|---|---|---|---|---|---|
| 256 × 256 | 50 | 14 | 6 mW | 40 mW | 1.1 nW/bit | <50 mW |
| 256 × 256 | 60 | 16 | 6 mW | 650 mW | 10.5 nW/bit | <660 mW |
| 1k × 1k | 60 | 14 | 96 mW | 650 mW | 0.9 nW/bit | <750 mW |

Dynamic Range Estimate:

Given a target pixel pitch of 15 μm×15 um, a bump pad size of 8 μm×8 μm and a capacitor density of 5.6 fF/um2 (e.g., using the aforementioned TowerJazz CA13 process) the integration capacitor 104 (FIG. 1), in at least one embodiment, can be as large as 900 fF. For illustrative purposes, in the following exemplary embodiment, assume that the integration capacitor 104 has a value of 600 fF. Using a 3.3V supply voltage minus two VDSsat gives approximately 2.8V of signal range. 2.8V*600 fF/1.6 e-19 e/C gives a dynamic range of approximately 10M electrons. In 14-bit mode this would equate to 600 electrons per bit. Assuming a mean detector current of 11 nA predicts an exposure time of 150 uS until the CTIA saturates.

Master Clock Rate Estimate:

Max clock rate required to the SDM is given by the frames per sec*pixels per slice*Over Sampling Ratio (OSR). For 256×256 imager at 100 FPS gives (100)*(256*64)*(64)=105 MHz (6.6 MSPS output rate). For a 1 k×1 k imager at 60 FPS gives (60)*(1000*64)*(64)=245 MHz (61 MSPS output rate), which is achievable in 130 nm CMOS.

Figure 4:
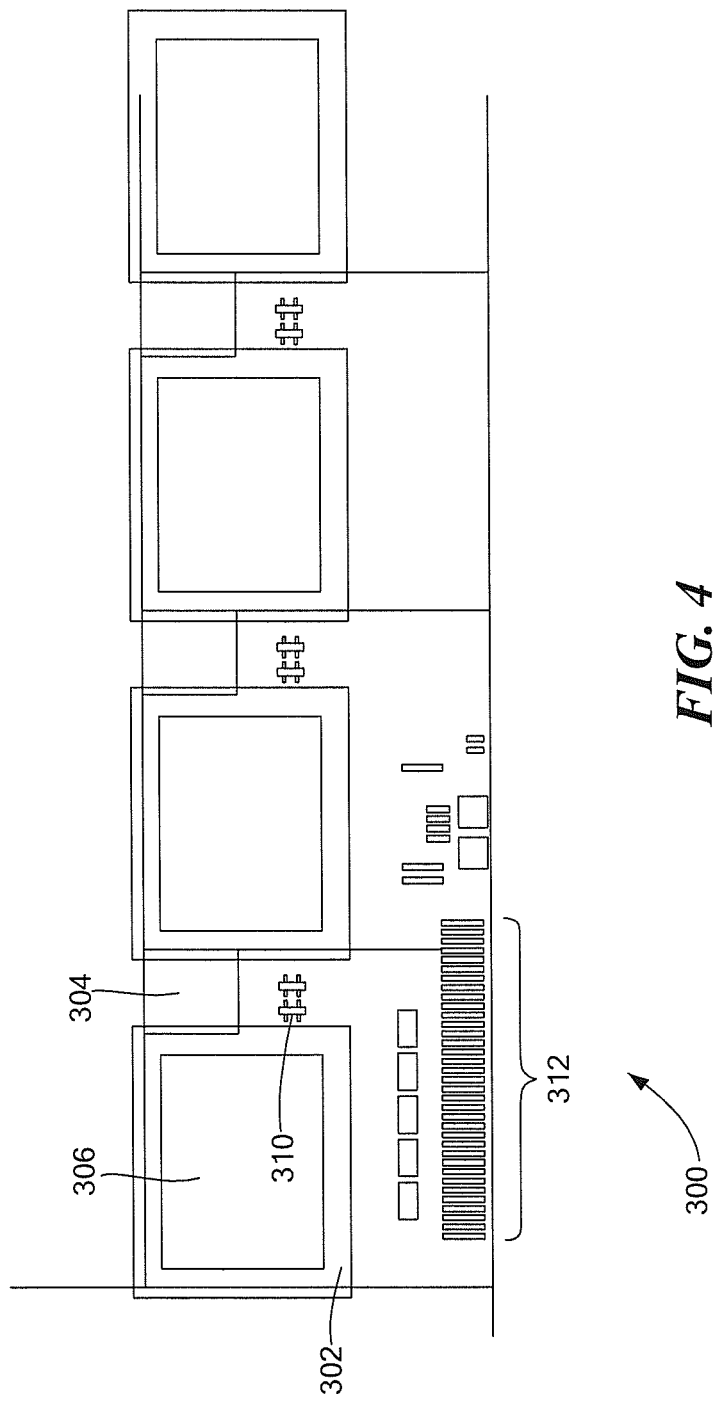
FIG. 4 is an illustrative example of a Read-Out Integrated Circuit (ROIC) pixel layout with multiplexor electronics in 30 μm×30 μm pixel size, in accordance with one embodiment of the invention.

Schematics:

In at least one embodiment of the invention, it was recognized that the power target for a large megapixel array could not be met with a CTIA 100 in each pixel. To reduce power, in accordance with one embodiment of the invention, the analog multiplexers are moved from the perimeter of the imager into each row, which will allow a single CTIA 100 to be time sliced between multiple photodiodes in the row. The current schematics show this architecture assuming a 64:1 multiplex function per row. For example, FIG. 4 shows a rough floor plan and demonstrates that all of the required circuitry and pads fit within the desired pixel pitch. In particular, FIG. 4 is an illustrative example of a Read-Out Integrated Circuit (ROIC) pixel layout 300 with multiplexor electronics in 30 μm×30 μm pixel size, in accordance with one embodiment of the invention.

Figure 2:
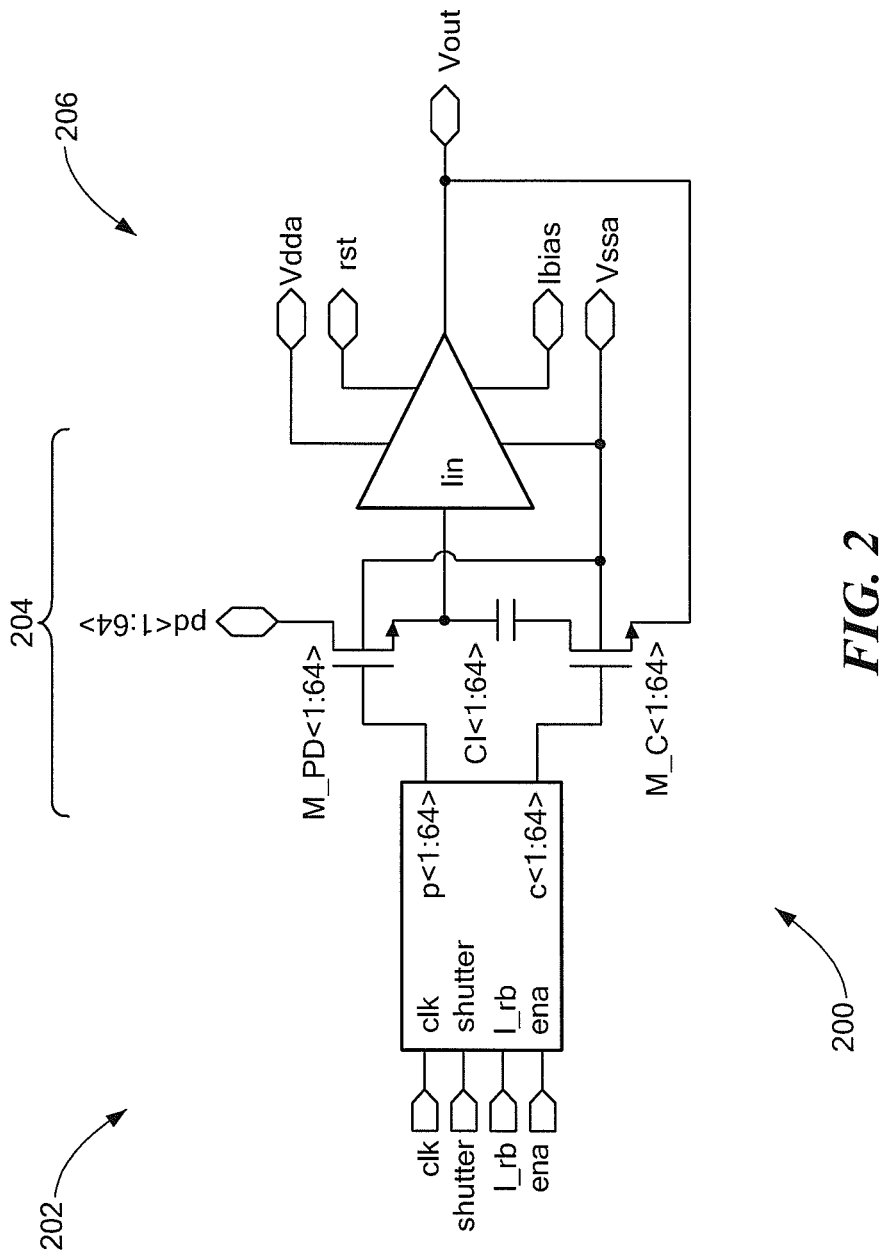
FIG. 2 is a circuit diagram per slice per row, in accordance with one embodiment of the invention.
Figure 3:
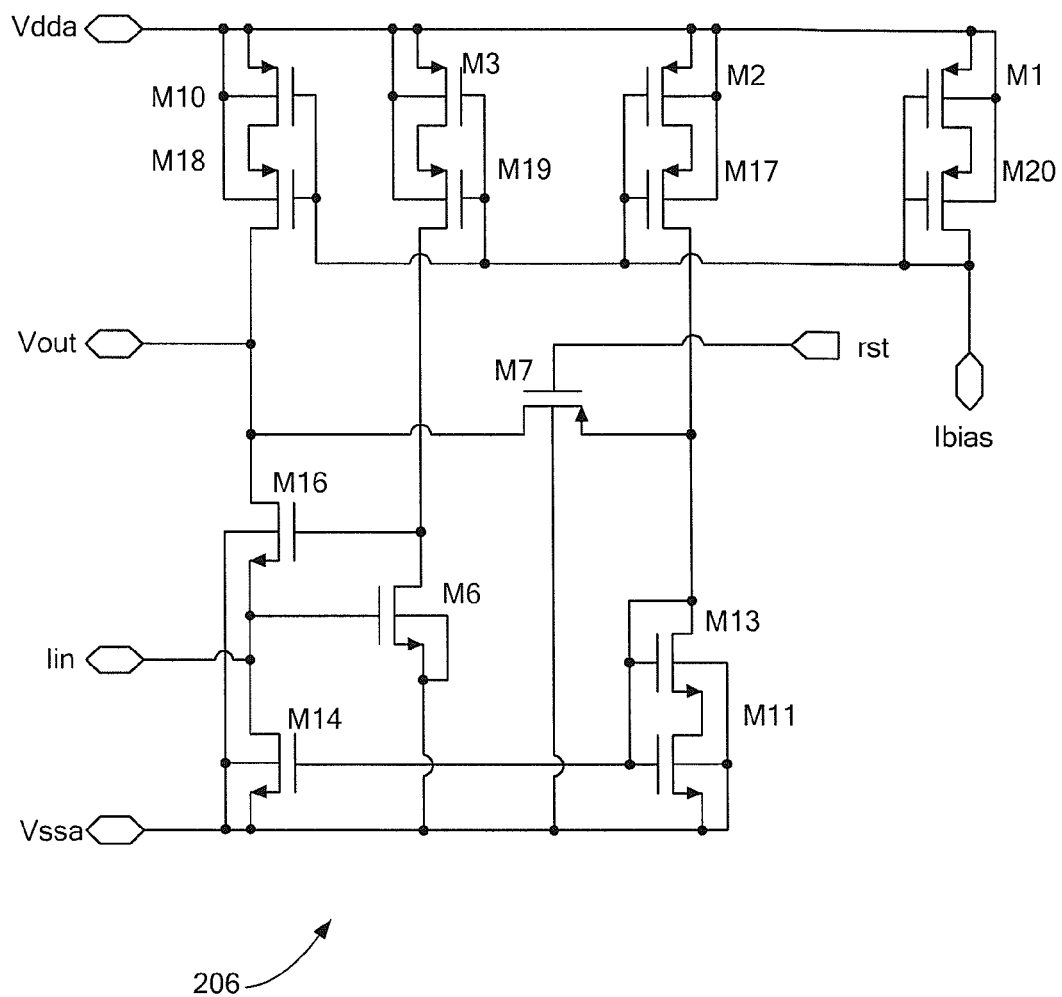
FIG. 3 is a block diagram of a Trans-Impedance amplifier (TIA), in accordance with one embodiment of the invention.

The schematic in FIG. 2 shows the design of the circuitry per slice per row. FIG. 2 is a circuit diagram 200 per slice per row, in accordance with one embodiment of the invention. Referring to FIG. 2, the first block on the left is the digital control logic 202 consisting mostly of a left/right shift 64 bit shift register to enable one pixel at a time. The center section 204 represents the per pixel analog multiplexers and integrating capacitor. The last block on the right 206 represents the Trans-Impedance Amplifier which is selectively coupled with each integrating capacitor to form the per pixel CTIA. FIG. 3 is a schematic block diagram of the TIA 206 of FIG. 2, in accordance with one embodiment of the invention.

The floor plan/pixel layout 300 of FIG. 4 demonstrates that at least one embodiment of the invention can be made to fit in the target pixel pitch (e.g., a 30 μm by 30 μm pixel size). Three plus of the sixty-four pixels are shown. The small squares 304 in the upper right of each pixel are the bump bonding pads 304, the large squares 306 are the integrating capacitors for each pixel, the two transistors 310 below the bump bond pad 304 and to the right of the capacitor 306 are the analog multiplexers, and the transistors 312 at the bottom left are the devices in the TIA 206 of FIG. 3.

MATLAB Read Out and Sigma Delta ADC Simulation

As those of skill in the art are aware, MATLAB®, produced by Mathworks, is a high-level language and interactive environment to perform computationally intensive tasks. MATLAB® was originally designed as a high level language for matrix manipulation and is an excellent tool for manipulation of images. MATLAB® was used during design and development of the instant invention to test the principles of the invention by inputting or creating test images, to divide them into slices and read out the slices in a serpentine manner as a single long vector. The vector is then input to a Simulink® model of a SDM ADC. The output of the SDM ADC is decoded from the serpentine vector to a reconstructed image slice, and the slices reassembled into a reconstructed image using MATLAB®. All of the MATLAB® code used during development can be found in FIGS. 35A-35D and FIGS. 36A-36F.

The following discussion provides a general explanation of the serpentine read out, in accordance with one embodiment of the invention, and then explains the progression of read out methods (including Methods 1, 2, and 3, described further herein) that were developed to mitigate image artifacts resulting from the application of a SDM ADC to the imaging application. Following that, the MATLAB and SIMULINK code used to pre and post process the images and simulate the SDM ADC will be explained from a high level.

Initially, test images with 64×64 pixels were used. The final test images used were 128×128 pixels with the exception of a 480×640 pixel outdoor scene with faces that was included to have a realistic image input. The 128×128 test image was divided into four 128×32 slices indexed as shown in FIG. 5, which is an illustrative example of Slice Indexing 500 for a 128×128 Test Image, in accordance with one embodiment of the invention. The test image 500 pixels are read out of the primary slices into a 32×128=4096 element row vector with odd rows read from left to right and even rows read from right to left as:

Row 1:      Column 1, 2, 3, 4, 5, 6, ... , 30, 31, 32

Row 2:      Column 32, 31, 30, 29, 28, 27, ... , 3, 2, 1

⋮

Row 127:    Column 1, 2, 3, 4, 5, 6, ... , 30, 31, 32

Row 128:    Column 32, 31, 30, 29, 28, 27, ... , 3, 2, 1

In the second and third readout schemes, redundant slices were used with the opposite read out serpentine direction, and averaged with the primary slices. Image artifacts that could be mitigated were best demonstrated in the horizontal gradient test image (discussed further herein in connection with FIG. 15), a flat field varying from left to right. Improvements were made to this test image by modifications to the method of read out, as will be discussed further herein.

Figure 6:
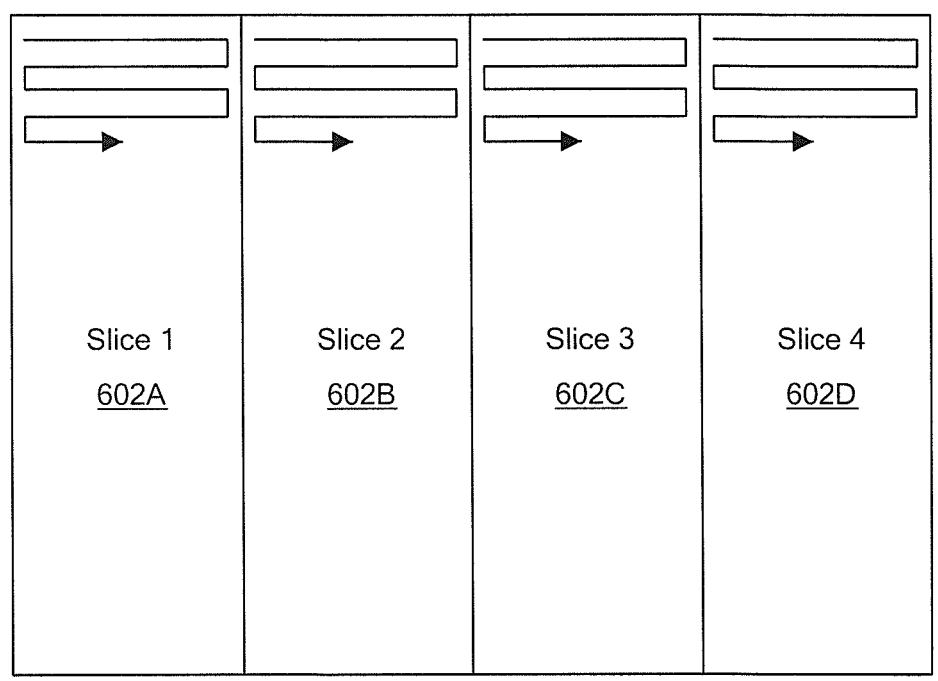
FIG. 6 is an illustrative example of Method 1—Simple read out method—image divided into four slices, in accordance with one embodiment of the invention.

Three different methods of read out are described, in accordance with one embodiment of the invention:

Method 1: Initially the image is divided into four slices, and each slice is read out as shown in FIG. 6, which is an illustrative example of Method 1—Simple read out method—image divided into four slices, in accordance with one embodiment of the invention. The horizontal gradient gained error (difference of the original and reconstructed image scaled to range from black to white) resulting from method 1 is shown in FIG. 9 in an illustrative grayscale image 900 showing a Gained Error Image of Horizontal Gradient using Method 1, in accordance with one embodiment of the invention. Row to row and slice boundary errors are seen in the gained error. This work was done with 64×64 test images.

Figure 7:
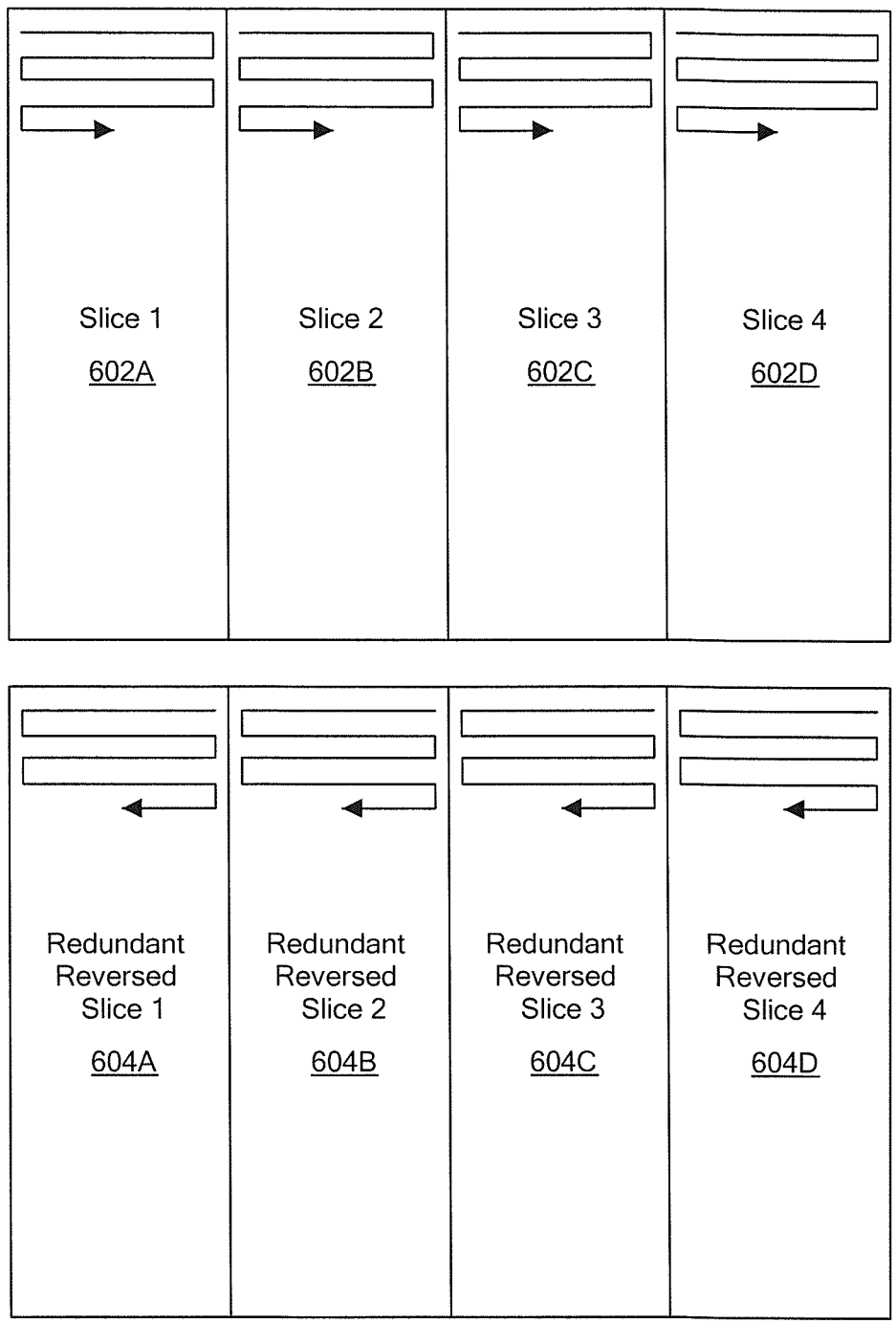
FIG. 7 is an illustrative example of Method 2—Image with aligned opposite serpentine slices averaged in, in accordance with one embodiment of the invention.

Method 2: To reduce the row to row image artifacts seen in FIG. 9, the second read out method uses four primary slices averaged with four identical redundant slices that read out in the opposite serpentine directions as shown in FIG. 7, which is an illustrative example of Method 2—Image with aligned opposite serpentine slices averaged in, in accordance with one embodiment of the invention. The horizontal gradient gained error (difference of the original and reconstructed image scaled to range from black to white) is shown in FIG. 10 is an illustrative grayscale image 1000 showing a Gained Error Image of Horizontal Gradient using Method 2, in accordance with one embodiment of the invention. Note that the row to row errors have been eliminated, but that there are still slice to slice errors. This work was done with 64×64 test images.

Figure 11A:
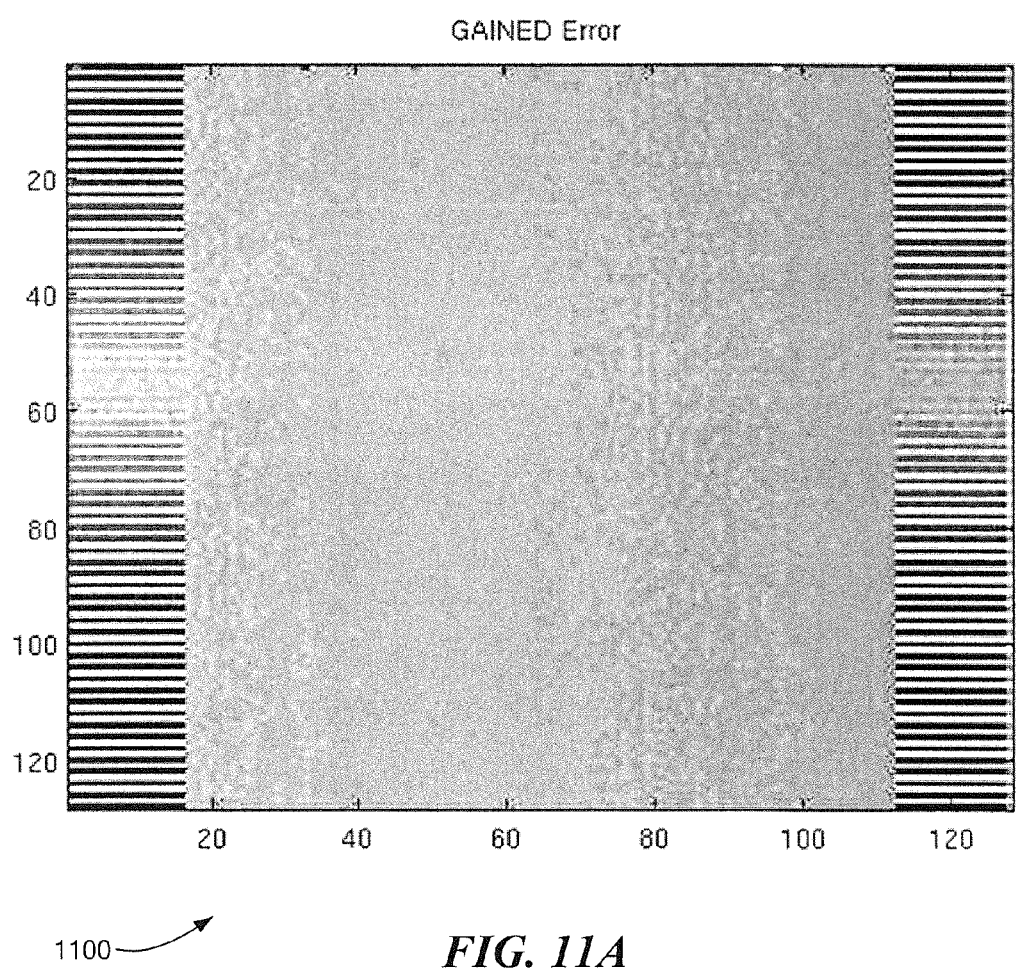
FIG. 11A is an illustrative grayscale image showing Improved Gained Error Image of Horizontal Gradient using Method 3, in accordance with one embodiment of the invention.

Method 3: Finally, the image was divided into four primary slices, and three redundant slices that both read out in the opposite serpentine direction and straddle the primary slices. This approach is shown in FIG. 8, which is an illustrative example of Method 3—Three overlapping opposite serpentine redundant slices averaged in, in accordance with one embodiment of the invention. In this example in, the slices were all buffered with an extra column on the left and right, as shown in FIG. 8, and the output of the SDM ADC was stripped of the extra columns and averaged into the primary and redundant slices. FIG. 11A is an illustrative grayscale image 1100 showing Improved Gained Error Image of Horizontal Gradient using Method 3, in accordance with one embodiment of the invention. Note that the redundant slices read out in this manner clearly fixed both the artifacts between rows and between columns. The left and right parts of the image were intentionally left without redundant over laid slices to demonstrate the benefits of this approach. As FIG. 11A illustrates, and as one of skill in the art will appreciate, the approach of Method 3 provides the best suppression of image artifacts related to the performance of the SDM ADC.

The Matlab Code that calls functions and pre and post processes the data is listed below in Matlab Code. A more detailed explanation of the code is found in FIGS. 35A-35E:

---

Matlab Code Top Level Matlab with Function Calls for Pre and Post Image Processing

---

```
src2D=gen_image('IM');
nslc=4;
[nrow,ncol]=size(src2D);
  [slice,redun]=slice_image(src2D,nslc);
global pstream rstream dec_stream rdn_stream Tpix Tsim;
Tpix=1e-6; Tsim=Tpix*(nrow+1)*ncol;
[pstream,rstream]=stream_redun(slice,redun,Tpix);
sim('snake_eye_GMP.mdl');
[proic,rroic]=destream_redun(dec_stream.data,rdn_stream,ncol/nslc+2,10);
roic1=deslice_img(proic(1:nrow,:,:)); roic2=deslice_img(rroic(1:nrow,:,:));
cps2=(ncol/nslc)/2;
dst2D=[roic1(:,1:cps2),(roic1(:,cps2+1:ncol-cps2)+roic2(:,:))/2,roic1(:,ncol-cps2+1:end)];
figure(101); imagesc(dst2D,[-1 1]); colormap(gray); title('ROIC Processed Image');
figure(102); imagesc(src2D-dst2D,[-1 1]); colormap(gray); title('Error Image');
figure(103); imagesc(src2D-dst2D); colormap(gray); title('GAINED Error');
rms(src2D-dst2D) function [src2D]=gen_image(tst_image)
```

A brief description of the function calls follows.

---

```
src2D=gen_image('IM');
```
This function generates the test images. The images choices are
HG: Horizontal gradient varying from −1 to + 1 in equal steps from left to right.
VG: Vertical gradient varying from −1 to + 1 in equal steps from top to bottom
HS: Horizontal Strips with 8 columns of "−1", 96 columns of "+1", 16 columns of "−1" and 8 columns of "+1" from left to right.
VS: Vertical Strips with 8 rows of "−1", 96 rows of "+1", 16 rows of "−1" and 8 rows of "+1" from top to bottom.
   IM: An image including a background and two people as an example of a more realistic image.
```
[slice,redun]=slice_image(src2D,nslc);
```

---

This function pads the image slices with one extra column at the start and end of the slice.

The image is sliced into an array called slice as follows for $i=1$ slice(1:128,1:32+2,1)=$src$(1:128,1:34)

for $i=2$ slice(1:128,1:32+2,2)=$src$(1:128,33:66)

for $i=3$ slice(1:128,1:32+2,3)=$src$(1:128,65:98)

for $i=4$ slice(1:128,1:32+2,4)=$src$(1:128,97:130)

A redundant image slice is created that overlay's two slices and reads out in the opposite serpentine direction from the primary slices.

The image is sliced into redundant slice arrays called redun as follows for $i=1$ redun(1:128,1:32+2,1)=$src$(1:128,17:50)

for $i=2$ redun(1:128,1:32+2,2)=$src$(1:128,49:82)

for $i=3$ redun(1:128,1:32+2,3)=$src$(1:128,81:114)

for i=4 there is no redundant slice for I=4

The arrays slice and redun are passed back from the function slice_image.
[pstream,rstream]=stream_redun(slice,redun,Tpix);
This function inputs the slice and redun arrays such that the rows of each slice is serialized into stream vectors. This data is demultiplexed in the snake_eye_GMP.mdl Simulink model of the SDM ADC.

Both pstream and rstream which are the serialized primary and redundant data streams are returned from the function.
sim('snake_eye_GMP.mdl')
This is a call to the Simulink snake_eye model which simulates the SDM ADC.

function [pslice,rslice]=destream_redun(stream,redun,ncol, offset)

The purpose of this function is to de-stream the data from the primary slices and the redundant slices that were serialized into a stream and processed through the smake_eye_GMP.mdl SDM ADC.

An index is created to step through the stream data to put it back into slices. The variable jj steps by 2
roic1=deslice_img(proic(1:nrow,:,:));   roic2=deslice_img (rroic(1:nrow,:,:))

This is two calls to function deslice_img, one for the primary roic output (proic), and one for the redundant roic output (rroic). The slices of the image are stripped of any buffer columns that were added and recombined into an image.
dst2D=[roic1(:,1:cps2),(roic1(:,cps2+1:ncol-cps2)+roic2 (:,:))/2,roic1(:,ncol-cps2+1:end)]

This statement is in the top level script "ReadOutSerpentineDual.m" rather than a function call, and it averages the primary and redundant images together.

Figure 11B:
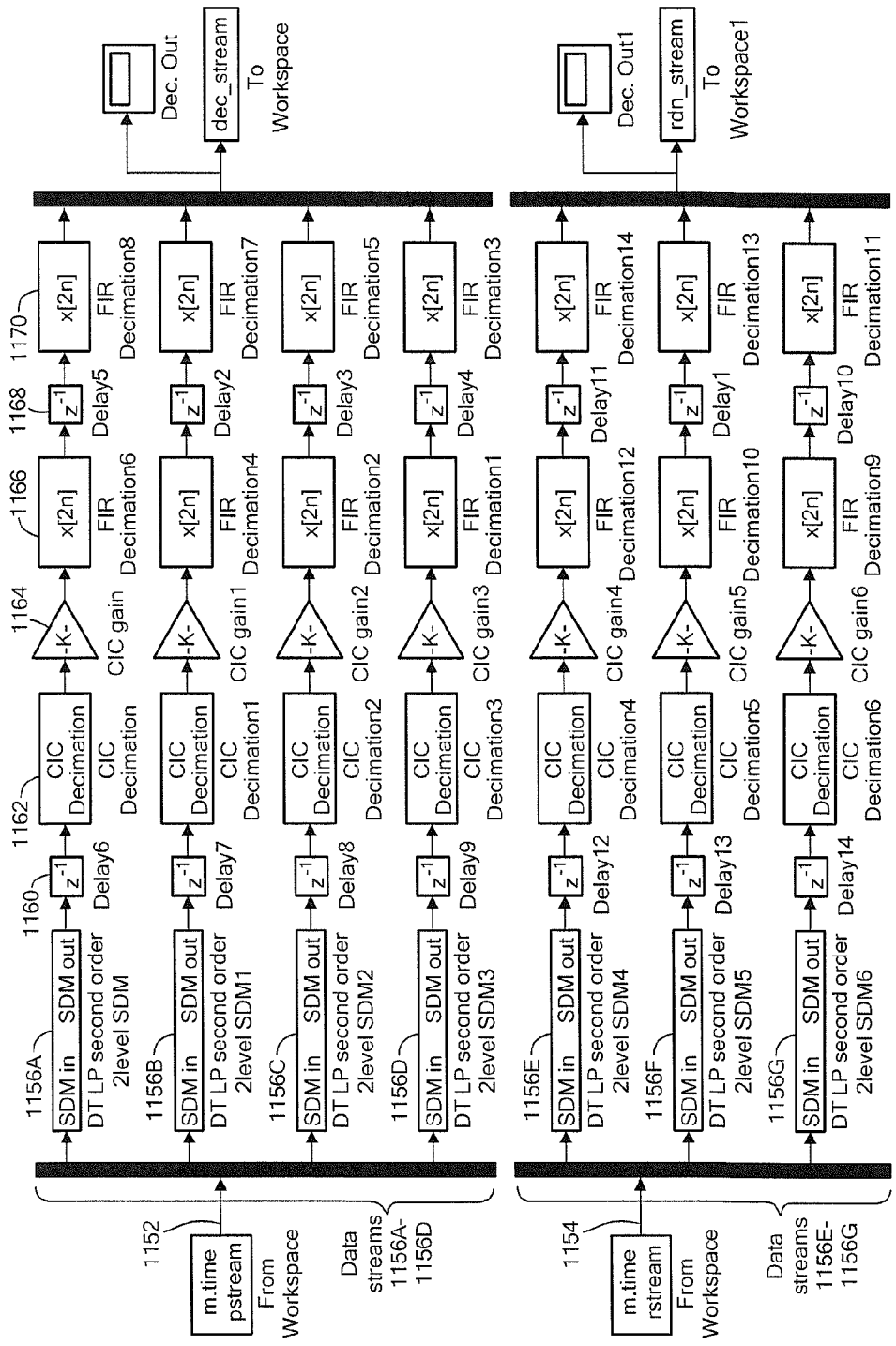
FIG. 11B is a top level block diagram of a sigma delta analog to digital converter (SDM ADC), in accordance with one embodiment of the invention.

The data from each slice is processed through a sigma delta ADC. For example, FIG. 11B is a top level block diagram of a sigma delta analog to digital converter (SDM ADC) 1150, in accordance with one embodiment of the invention, that is usable to process the data from each slice. In the SDM ADC 1150, the over sampling ratio (OSR) used is 64. The input comes from a series of time points at 1 us intervals.

Referring still to FIG. 11A, the data comes into the "From Workspace" blocks as [pstream.time pstream.data] on the top bus 1152, and as [rstream.time rstream.data] on the bottom bus 1154. The sample time is Tpix/64. The top bus 1152 has four data streams 1156A-1156D which are demultiplexed to the top four SDM ADCs 1158A-1158D. The top bus 1152 includes data from the four primary slices 602 (see FIGS. 6-8) of the image. The bottom bus 1154 has three data streams 1156E-1156G which are demultiplexed to the bottom three SDM ADCs 1158E-1158G. The bottom bus 1154 includes data from the 3 redundant slices 604 (see FIG. 8) of the image which overlap the four primary slices 602 and are read out in the opposite direction.

Referring still to FIG. 11B, the blocks from left to right for each slice data stream are DT LP second order 2 level SDM 1158: The sigma delta modulator First Unit delay 1160

CIC Decimation 1162: A cascaded integrator-Comb decimator filter with Decimation factor=16, Differential delay=2, Number of sections=3, and Data type specification mode=full precision CIC gain 1164: A gain of $(5/4)^2 \hat{} -15=3.8147e-05$ First FIR Decimation 1166: FIR filter with FIR filter coefficients=[18 0 −116 0 429 0 −1277 0 5042 8192 5042 0 −1277 0 429 0 −116 0 18]./16384=0.0011 0 −0.0071 0 0.0262 0 −0.0779 0 0.3077 0.5000 0.3077 0 −0.0779 0 0.0262 0 −0.0071 0 0.0011

Second Unit delay 1168

Second FIR Decimation filter 1170 with FIR filter coefficients=[18 0 −116 0 429 0 −1277 0 5042 8192 5042 0 −1277 0 429 0 −116 0 18]./16384=0.0011 0 −0.0071 0 0.0262 0 −0.0779 0 0.3077 0.5000 0.3077 0 −0.0779 0 0.0262 0 −0.0071 0 0.0011

Note that the above listings of gains, delays, filter coefficients, etc., are provided by way of example only and are not limiting.

Figure 12:
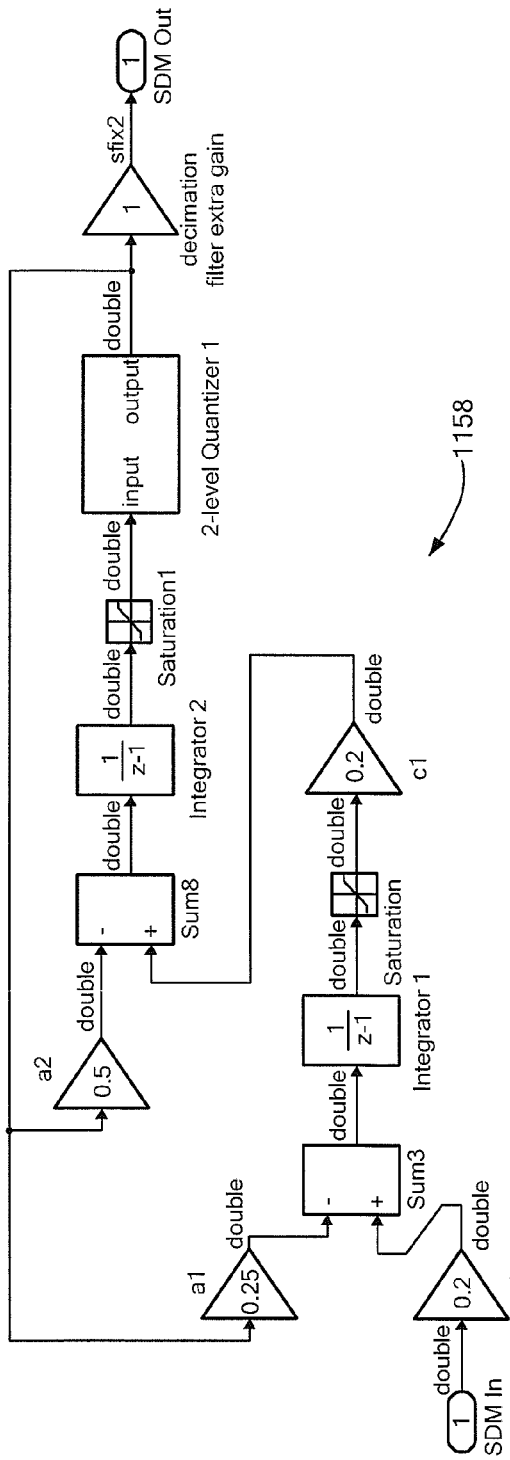
FIG. 12 is a schematic block diagram of a DT LP second order 2-level SDM, in accordance with one embodiment of the invention.
Figure 13:
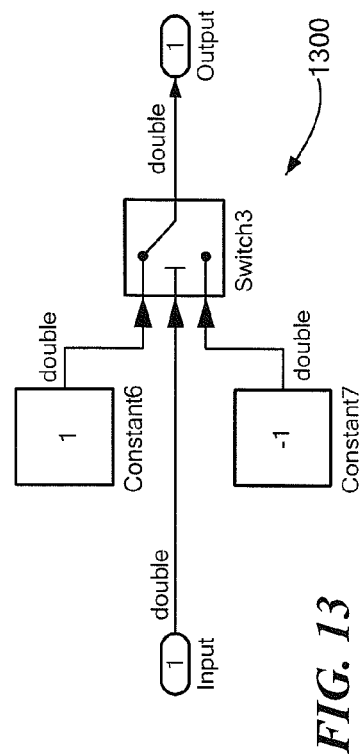
FIG. 13 is a schematic block diagram of a two level quantizer, in accordance with one embodiment of the invention.
Figure 14:
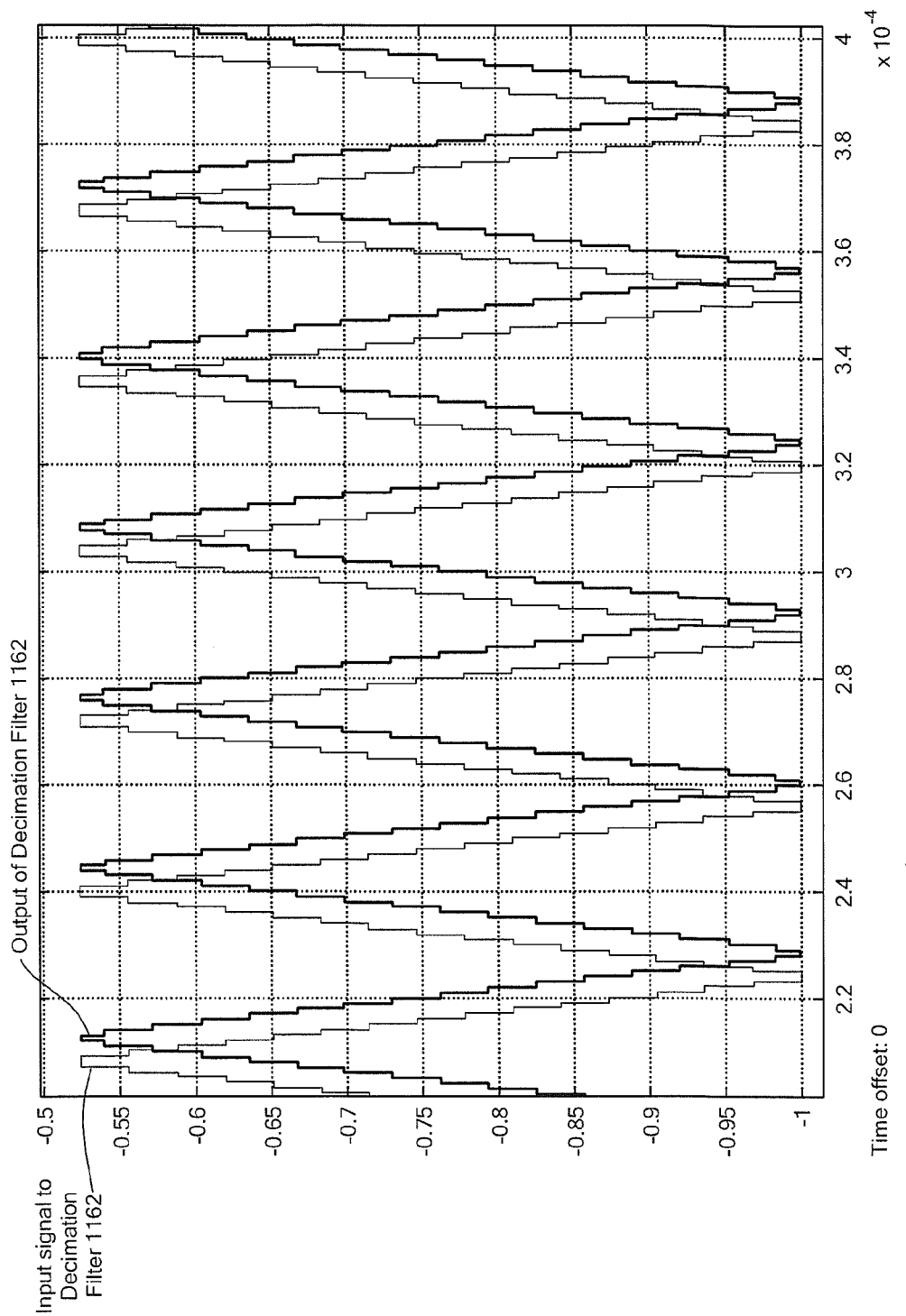
FIG. 14 is a graph showing the input signal and the output signal of a decimation filter in the SDM of FIG. 12.

After all of the blocks, the data streams are multiplexed together and output to the workspace as dec_stream for the four primary streamed slices, and rdn_stream for the three redundant slices. FIG. 12 is a schematic block diagram of the SDM 1158 of FIG. 11A, in accordance with one embodiment of the invention. The SDM 1158 uses a two level quantizer 1300 (an illustrative example of which is shown in FIG. 13, which is a schematic block diagram of the two-level quantizer 1300 of FIG. 12). Based upon the level of the input signal to the SDM 1158 relative to a threshold of "0," the two level quantizer 1300 outputs either a "1" or a "−1". FIG. 14 is a graph showing the input signal and the output signal of a decimation filter in the SDM of FIG. 12, in one exemplary embodiment.

Figure 31:
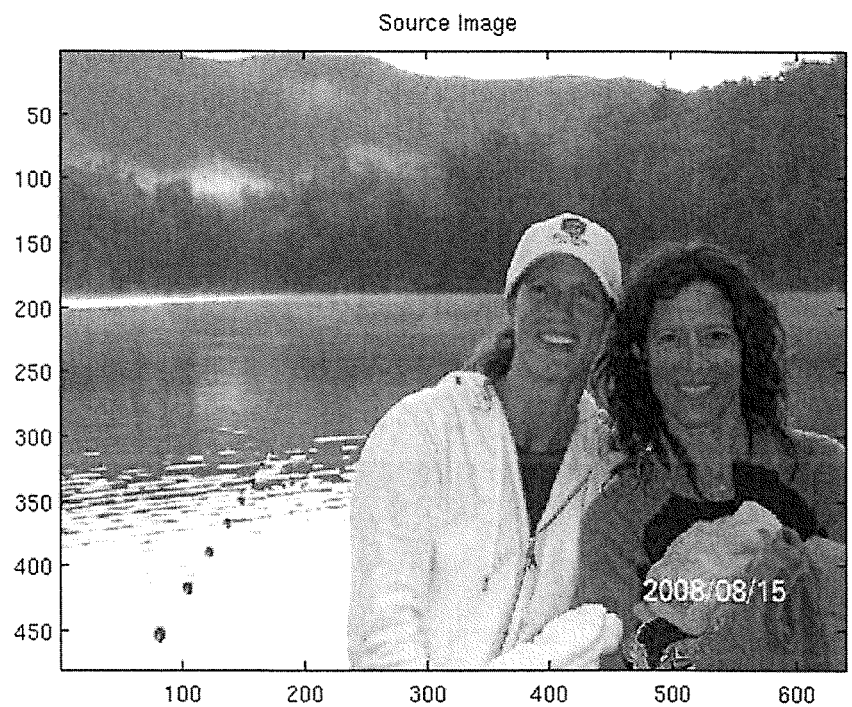
FIG. 31 is an illustrative grayscale photographic image showing faces, 480×640 pixels.

Five illustrative test images were used to evaluate the SDM ADC 1158 using a serpentine readout (i.e., Method 3). These include a horizontal gradient (HG) (FIG. 15), a vertical gradient (HG) (FIG. 19), a horizontal step (HS) function (FIG. 23), a vertical step (VS) function (FIG. 27), and an actual outdoor scene with faces as an example of a realistic image (FIG. 31).

Figure 15:
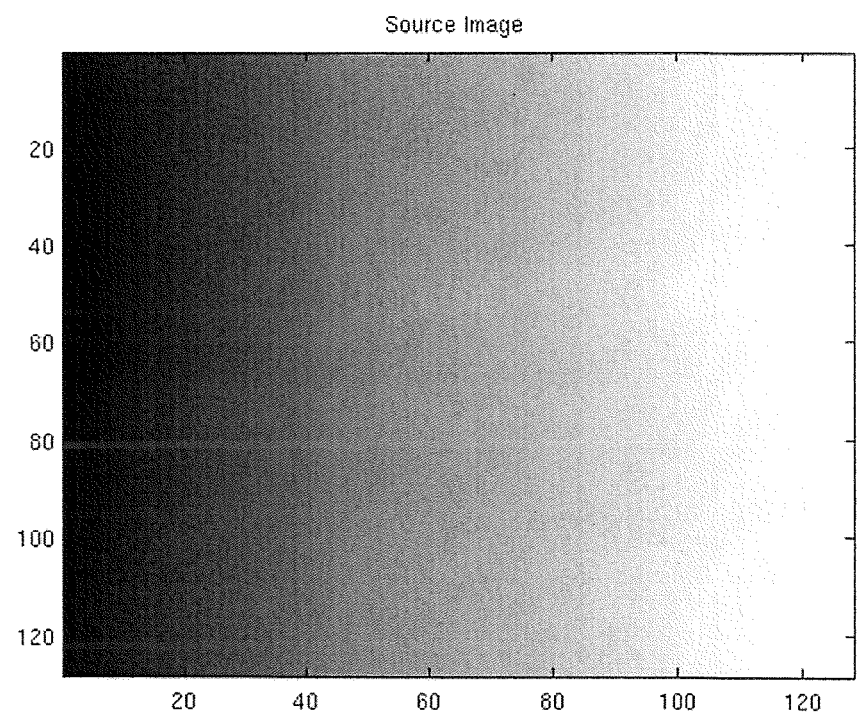
FIG. 15 is an illustrative grayscale Horizontal gradient test image from −1 to 1 left to right, 128×128 pixels, in accordance with one embodiment of the invention.

The first test image (HG) of FIG. 15 is a 128×128 pixel, gradient image 1500 that varies by column from left to right from a value of −1 to a value of 1. The gradient is divided evenly over the 128 pixels of this Source Image.

Figure 16:
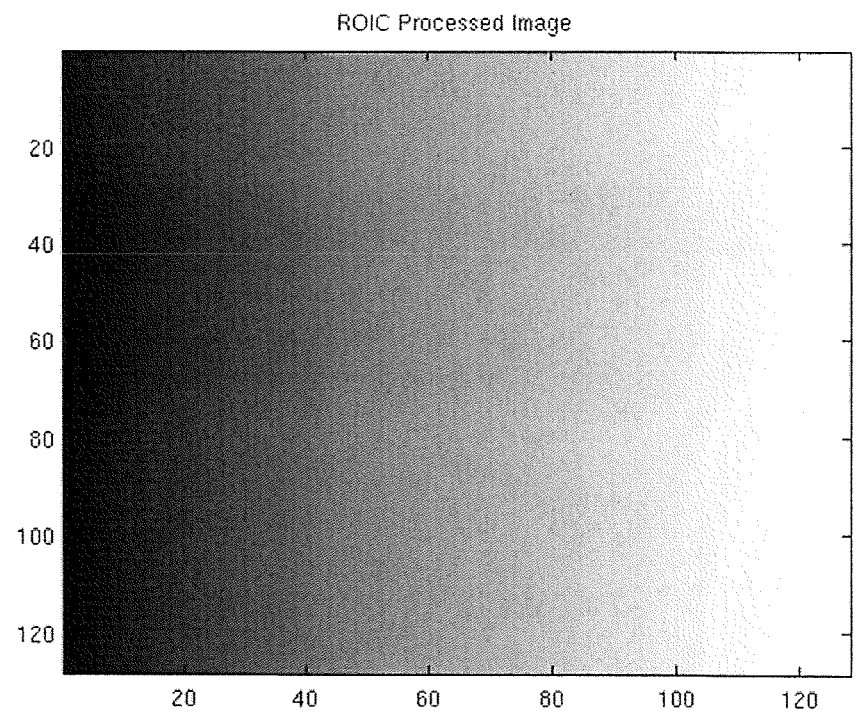
FIG. 16 is an illustrative grayscale image showing the Horizontal gradient test image of FIG. 15 as a converted and reconstructed horizontal gradient test image, in accordance with Method 3 of FIG. 8.

FIG. 16 is an illustrative grayscale image 1600 showing the Horizontal gradient test image 1500 of FIG. 15 as a converted and reconstructed horizontal gradient test image, in accordance with Method 3 of FIG. 8. That is, the ROIC image 1600 of FIG. 16 shows the Source image 1500 of FIG. 15 after it has been divided into four slices of 128×32 pixels, processed through the SIMULINK® SDM ADC (e.g., the SDM 1158 of FIG. 11B) and reconstructed using method 3.

Figure 17:
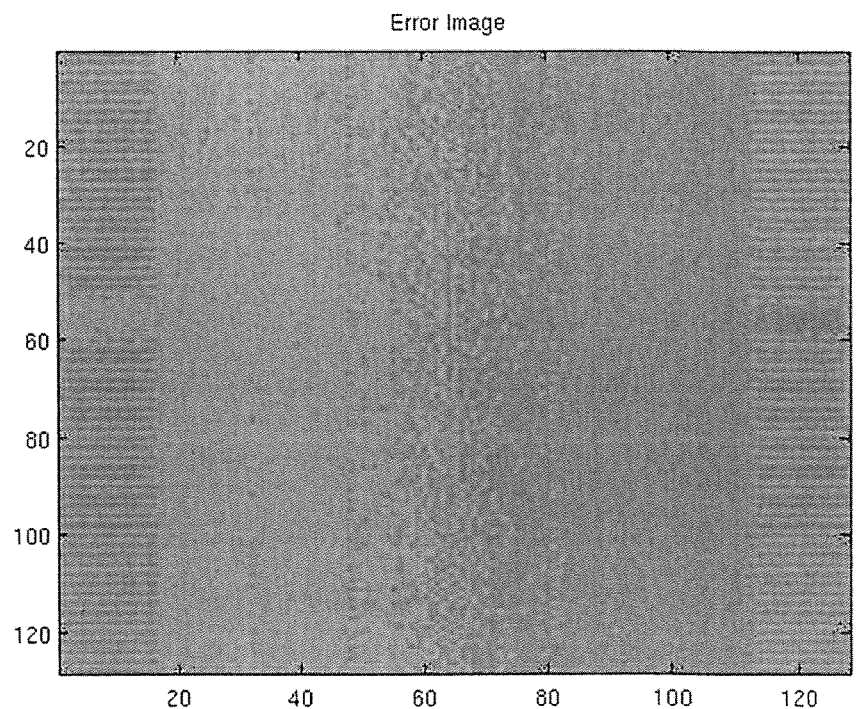
FIG. 17 is an illustrative grayscale image showing, for the image of FIG. 16, the error in the horizontal gradient and reconstructed horizontal gradient test image processed in accordance with Method 3.

FIG. 17 is an illustrative grayscale image 1700 showing, for the Source Image 1500 of FIG. 15 and the ROIC image 1600 of FIG. 16, the error in the horizontal gradient and reconstructed horizontal gradient test image processed in accordance with Method 3. The error image 1700 of FIG. 17 shows errors between each row within the slices on the ends. The errors are corrected in the center where redundant slices are averaged in.

Figure 18:
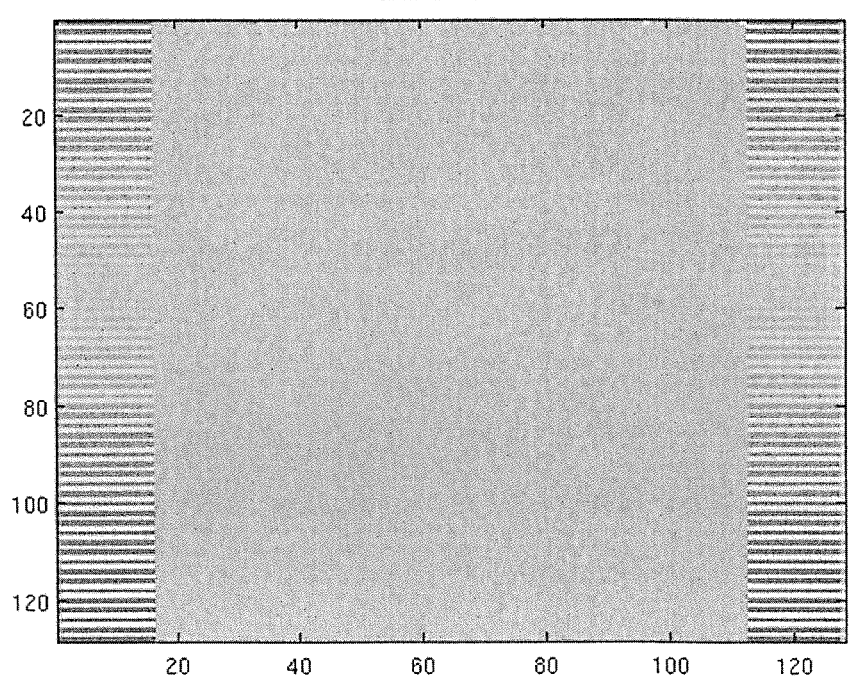
FIG. 18 is an illustrative black and white image showing, for the image of FIGS. 16 and 17, the gained Error—horizontal gradient and reconstructed horizontal gradient—Method 3.

FIG. 18 is an illustrative grayscale image 1800 showing, for the image of FIGS. 16 and 17, the gained Error—horizontal gradient and reconstructed horizontal gradient—Method 3. In particular, the image 1800 of FIG. 18 shows the gained error of the difference of horizontal gradient image and reconstructed horizontal gradient image using method 3. It is important to note that the use of redundant slices with the pixels read out in the opposite serpentine direction, and averaged with the regular slices has reduced or eliminated the artifacts shown that remain in the right and left of the image.

Figure 19:
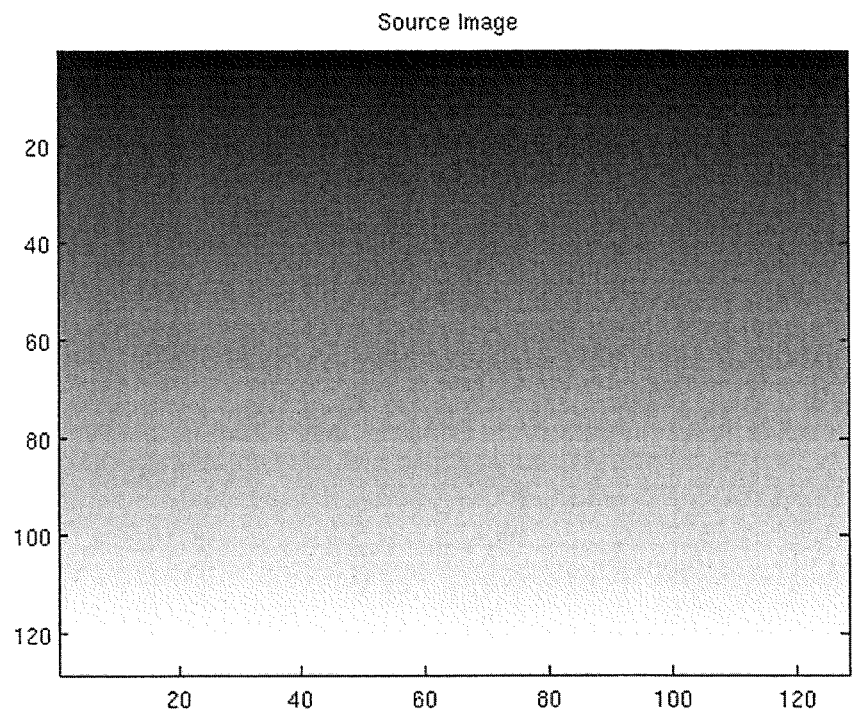
FIG. 19 is an illustrative grayscale Vertical gradient test image from −1 to 1 top to bottom, 128×128 pixels, in accordance with one embodiment of the invention.

The second test image (VG) is a vertical gradient 128×128 pixel image that varies from top to bottom by row from a value of −1 to a value of 1 as shown in FIG. 19.

Figure 20:
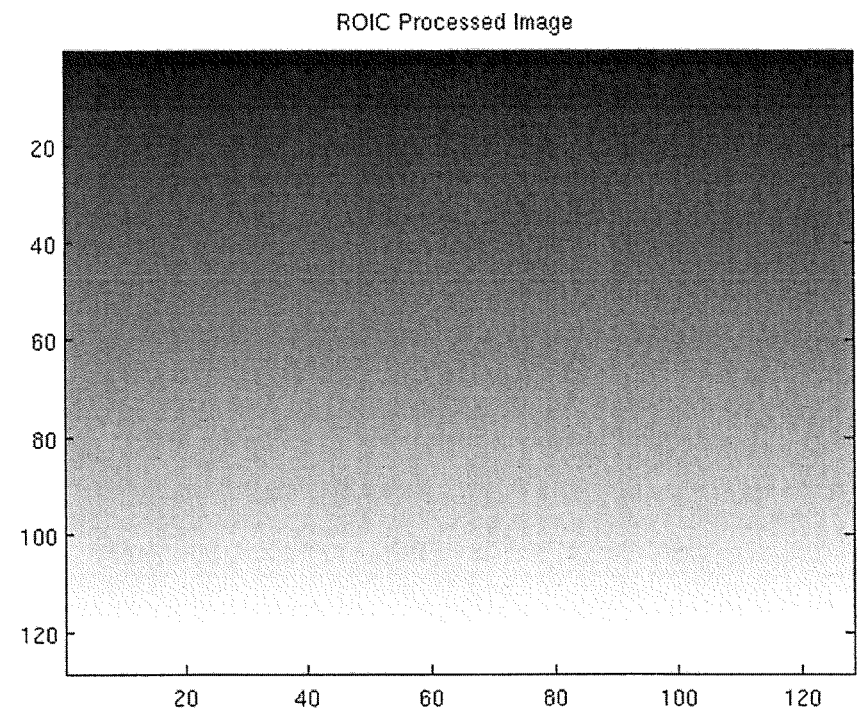
FIG. 20 is an illustrative grayscale image showing the vertical gradient test image of FIG. 19 as a Reconstructed vertical gradient test image, in accordance with Method 3 of FIG. 8.

FIG. 20 is an illustrative grayscale image 2000 showing the vertical gradient test image 1900 of FIG. 19 as a Reconstructed vertical gradient test image, in accordance with Method 3 of FIG. 8. FIG. 20 shows the image 1900 after it has been divided into four 128×32 slices, processed through the SIMULINK® SDM ADC, and reconstructed using method 3. It is apparent that there are some image artifacts created between slices.

Figure 21:
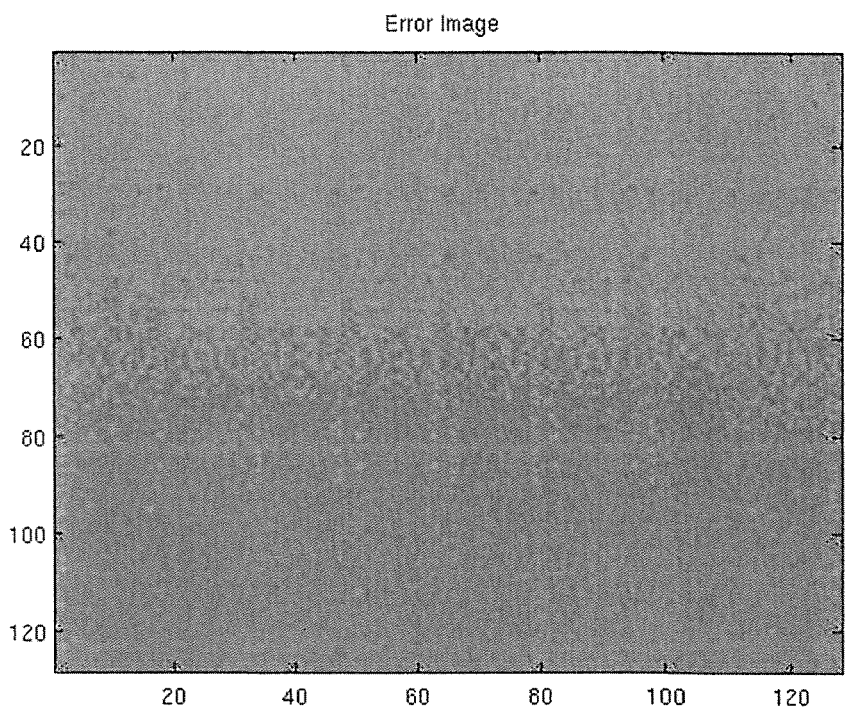
FIG. 21 is an illustrative grayscale image showing, for the vertical gradient test image of FIGS. 19 and 20, the error in vertical gradient and reconstructed vertical gradient.

FIG. 21 is an illustrative grayscale image showing, for the vertical gradient test image of FIGS. 19 and 20, the error in vertical gradient and reconstructed vertical gradient. In particular, the image 2100 of FIG. 21 is an image of the error between the original image 1900 of FIG. 19, and the reconstructed image 2000 of FIG. 20, using method 3.

Figure 22:
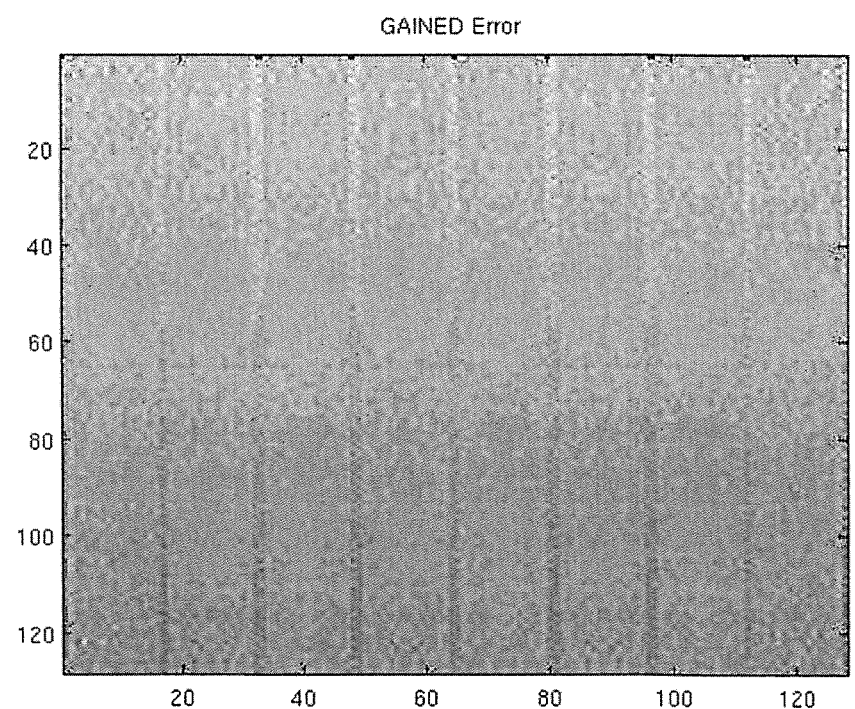
FIG. 22 is an illustrative grayscale image showing, for the vertical gradient test image of FIGS. 19 and 20, the gained error in vertical gradient and reconstructed vertical gradient.

FIG. 22 is an illustrative grayscale image showing, for the vertical gradient test image of FIGS. 19 and 20, the gained error in vertical gradient and reconstructed vertical gradient. FIG. 22 shows the gained error of the difference of vertical gradient and reconstructed vertical gradient image.

Figure 23:
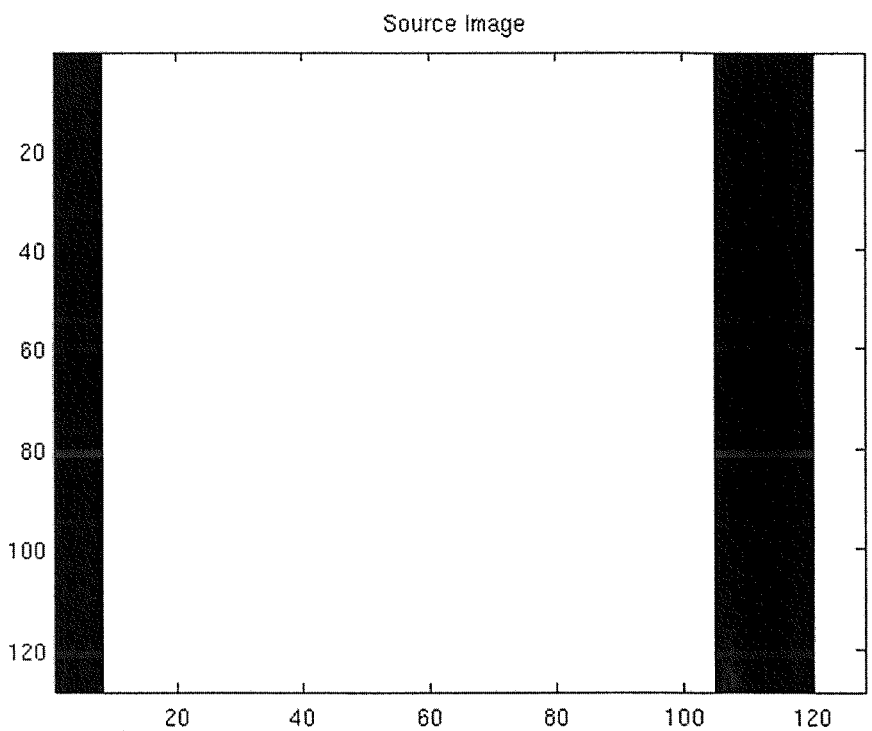
FIG. 23 is an illustrative grayscale 23 horizontal step (HS) Step function image, 128×128 pixels, in accordance with one embodiment of the invention.
Figure 24:
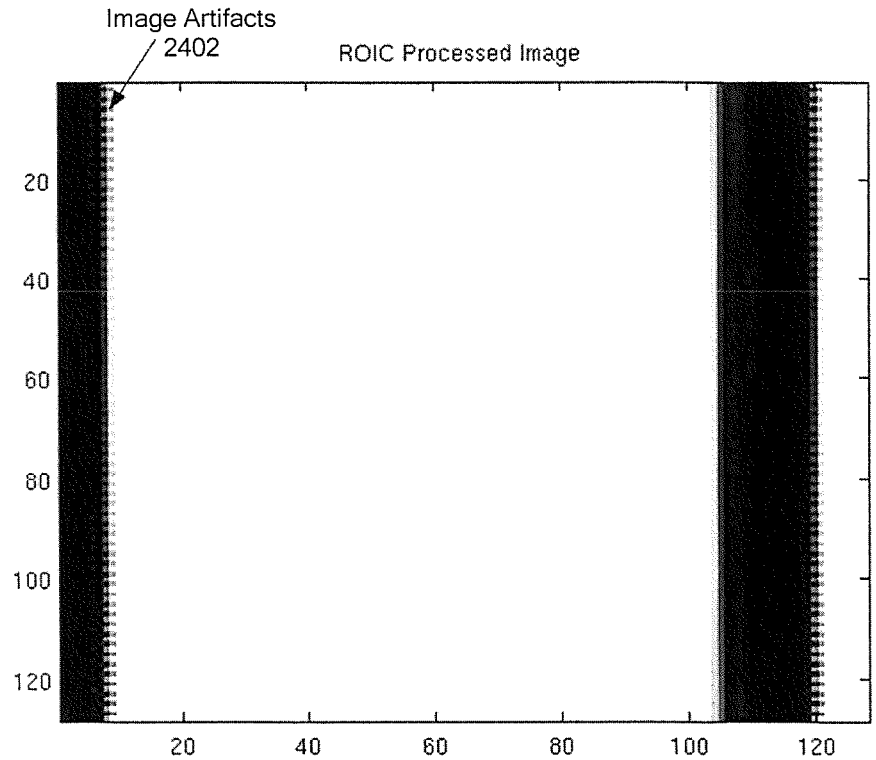
FIG. 24 is an illustrative grayscale image showing the step function test image of FIG. 23 after being SDM ADC converted and reconstructed.

The third test image considered is a 128×128 pixel, step image 2200 that has horizontal step (HS) functions from −1 to a value of 1 at the locations as shown in FIG. 23. FIG. 24 is an illustrative grayscale image 2300 showing the step function test image of FIG. 23 after being SDM ADC converted and reconstructed. In particular, FIG. 24 shows the step image 2200 after it has been divided into four 128×32 slices, processed through the SIMULINK® SDM ADC, and reconstructed using method 3. It is apparent that there are image artifacts 2402 on the boundary of the step. A step function is a known problem for the SDM ADC in that there is a lag for the converters tracking to catch up. This demonstrates the worst case scenario for a SDM ADC. The intent of reading out in a serpentine manner is to avoid converting large step functions.

Figure 25:
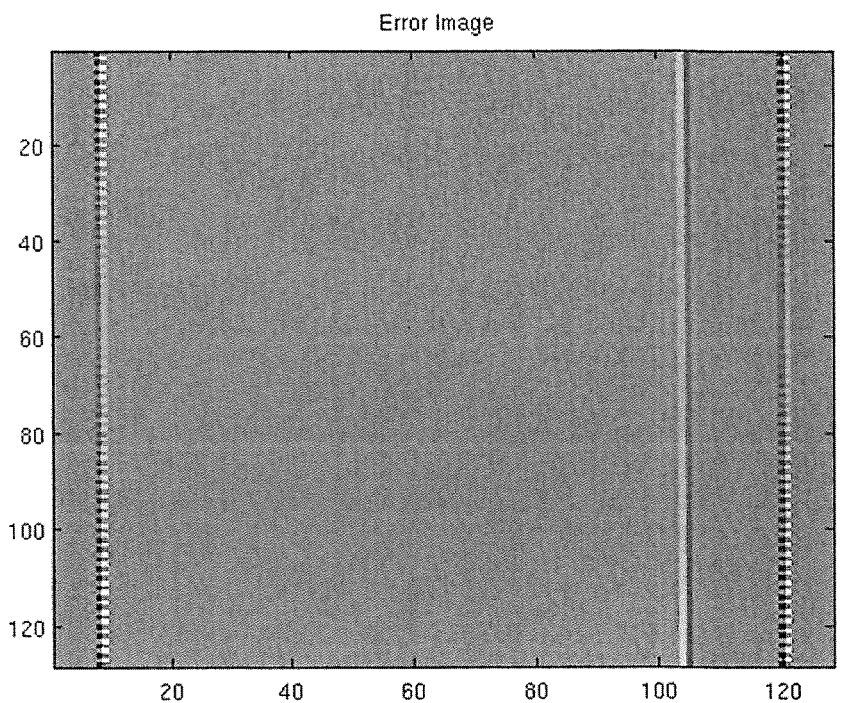
FIG. 25 is an illustrative grayscale image showing, for the step function image of FIGS. 23 and 24, the error in horizontal step and reconstructed horizontal step—Method 3.
Figure 26:
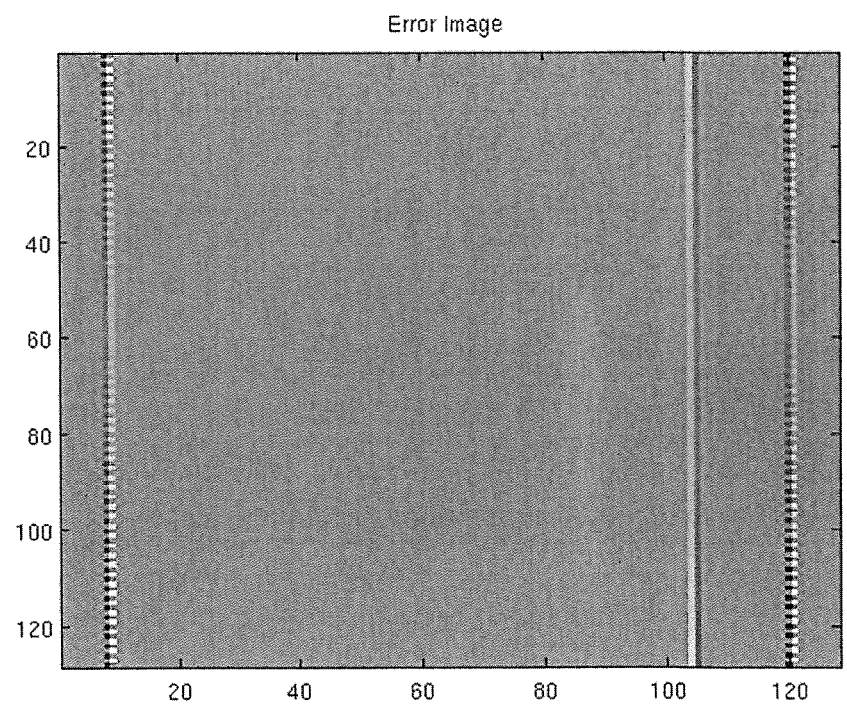
FIG. 26 is an illustrative grayscale image showing, for the step function image of FIGS. 23 and 24, the gained error in horizontal step and reconstructed horizontal step.

FIG. 25 is an illustrative grayscale image 2500 showing, for the step function image of FIGS. 23 and 24, the error in horizontal step and reconstructed horizontal step—Method 3. This image 2500 shows the benefits of reconstruction using method 3. An actual image would not show the same artifacts due to the spatial filtering effect of the optics on the image before it is digitized. In addition, FIG. 26 shows the gained error of the difference of vertical gradient and reconstructed vertical gradient image.

Figure 27:
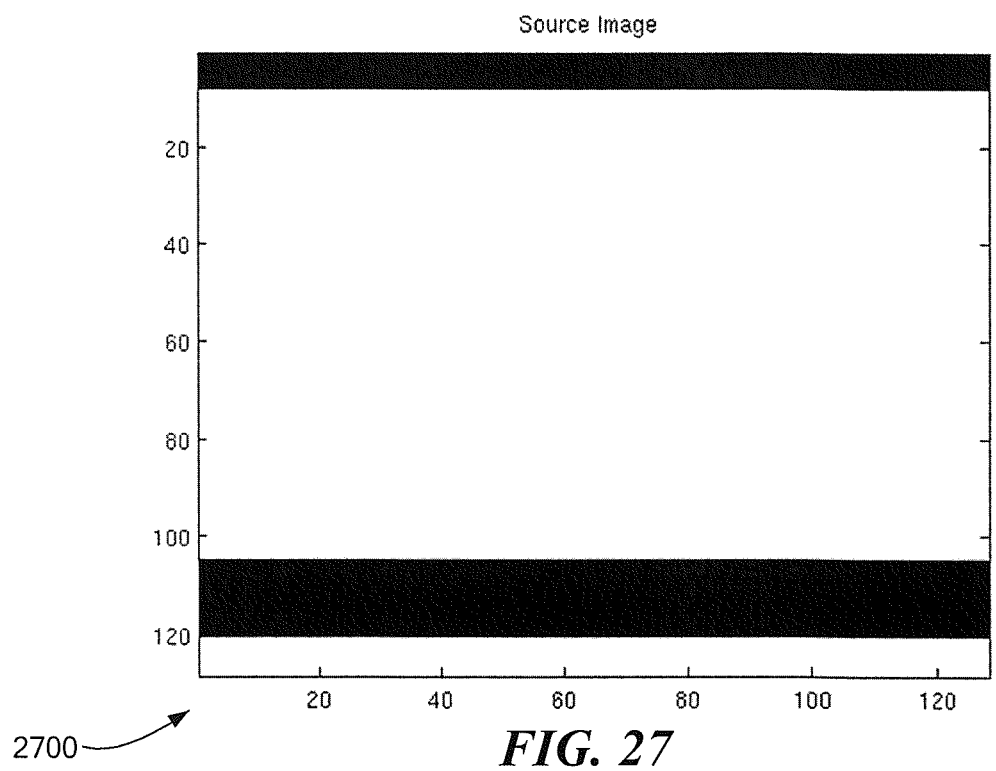
FIG. 27 in an illustrative grayscale vertical step function image, 128×128 pixels, in accordance with one embodiment of the invention.
Figure 28:
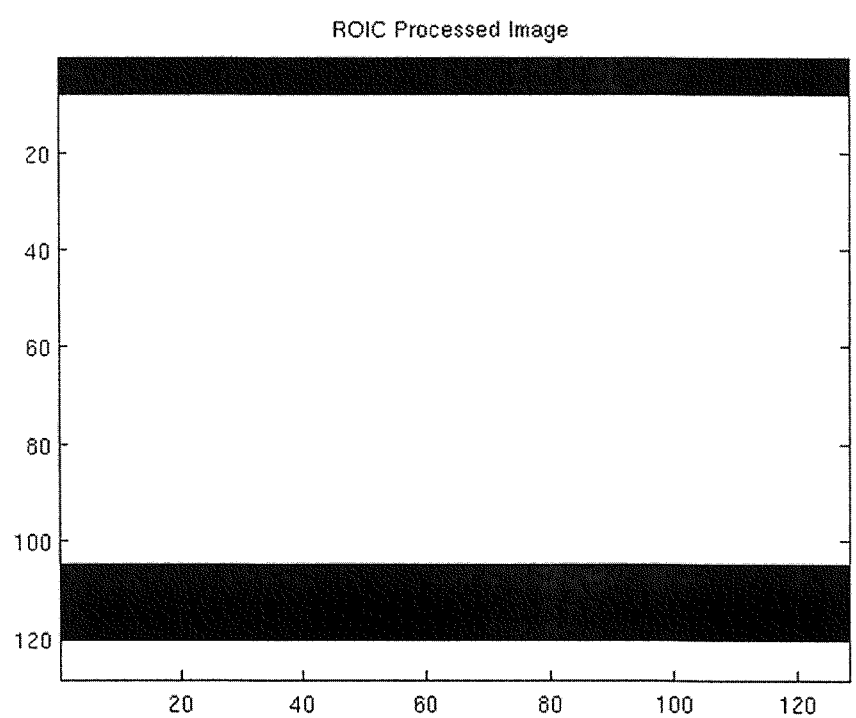
FIG. 28 is an illustrative grayscale image showing the vertical step function test image of FIG. 27 after being SDM ADC converted and reconstructed.

The fourth test image considered shown in FIG. 27, which is an illustrative grayscale vertical step function image, 128× 128 pixels, in accordance with one embodiment of the invention. The test image 2700 of FIG. 27 is a 128×128 pixel, step image that has vertical step functions from −1 to a value of 1 at the locations as shown. FIG. 28 is an illustrative grayscale image 2800 showing the vertical step function test image of FIG. 27 after being SDM ADC converted and reconstructed. In particular, FIG. 28 shows the image after it has been divided into four 128×32 slices, processed through the SIMULINK® SDM ADC, and reconstructed.

Figure 29:
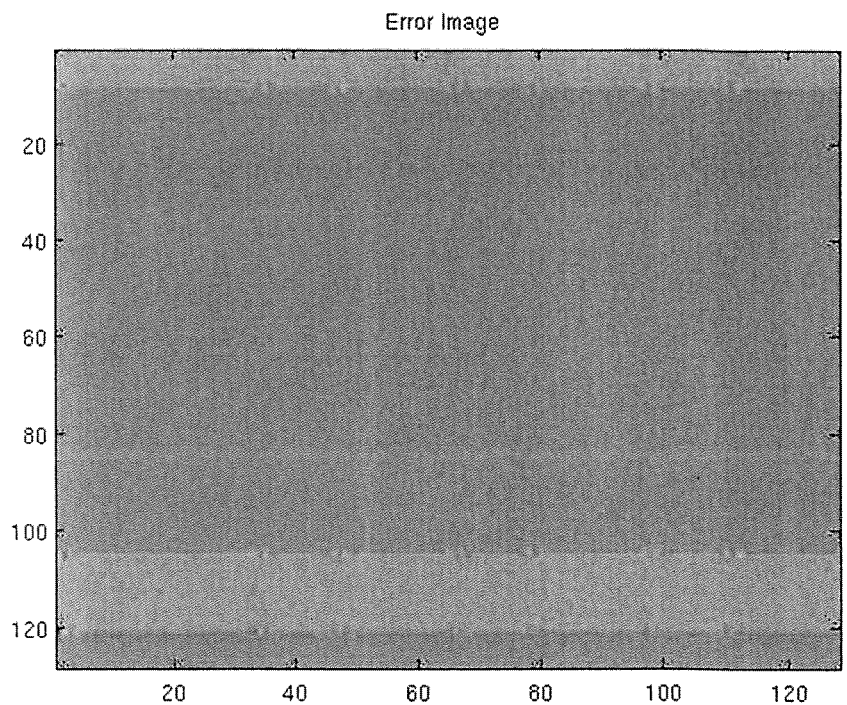
FIG. 29 is an illustrative grayscale image showing, for the images of FIGS. 27-29, the error in vertical step and reconstructed vertical step.

FIG. 29 is an illustrative grayscale image 2900 showing, for the images of FIGS. 27-29, the error in vertical step and reconstructed vertical step. In particular, FIG. 29 shows the error of the difference of vertical stripe and reconstructed vertical stripe image.

Figure 30:
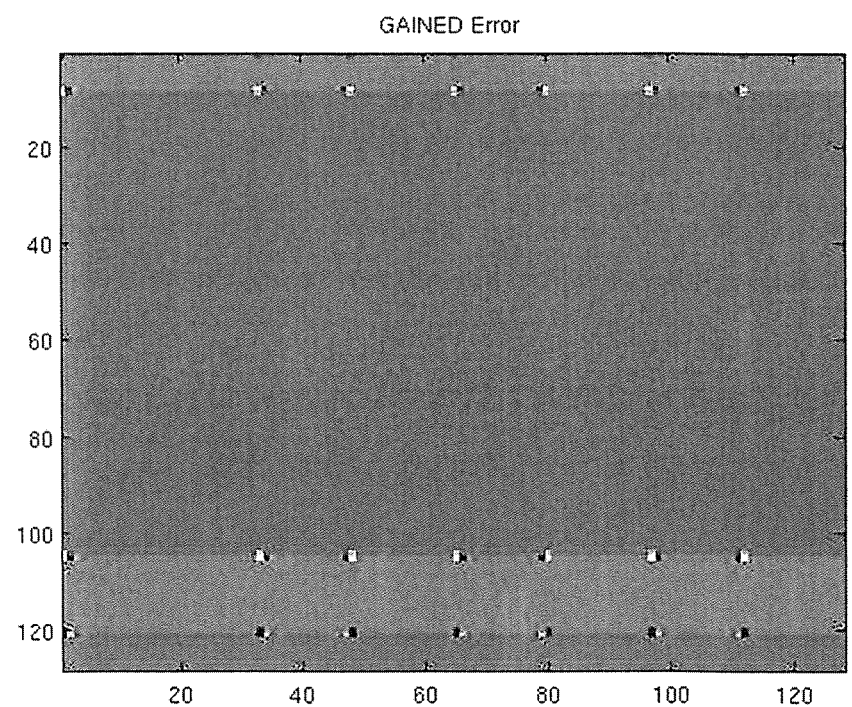
FIG. 30 is an illustrative grayscale image showing, for the images of FIGS. 27-29, the gained error in vertical step and reconstructed vertical step.

FIG. 30 is an illustrative grayscale image 3000 showing, for the images of FIGS. 27-29, the gained error in vertical step and reconstructed vertical step. In particular, the image 3000 is an image of the gained error between the original image (VS), and the reconstructed image. The process to gain the error magnifies small errors since it automatically scales the error to the full range. The errors are in most cases limited to a small number of counts on the scale.

Figure 32:
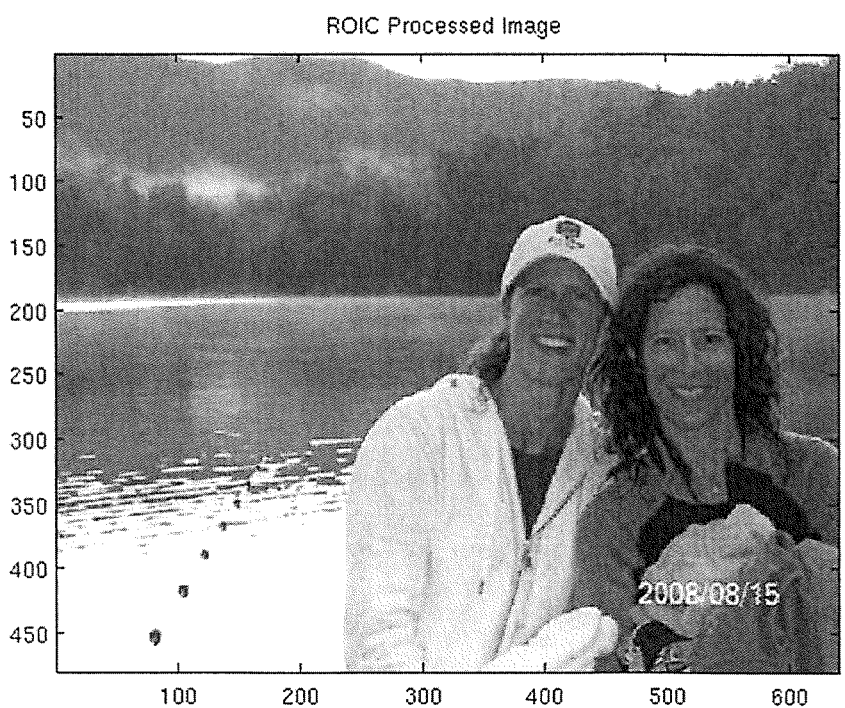
FIG. 32 is an illustrative grayscale photographic image showing the image of FIG. 31 after being converted and reconstructed, in accordance with on embodiment of the invention.

The final image considered is a 480×640 pixel image of an actual outdoor scene with faces in it as shown in FIG. 31. FIG. 32 is an illustrative grayscale photographic image 3200 showing the image of FIG. 31 after being converted and reconstructed, in accordance with on embodiment of the invention. In particular, FIG. 32 shows the image after it has been divided into four 480×160 slices, processed through the SIMULINK® SDM ADC, and reconstructed using method 3.

Figure 33:
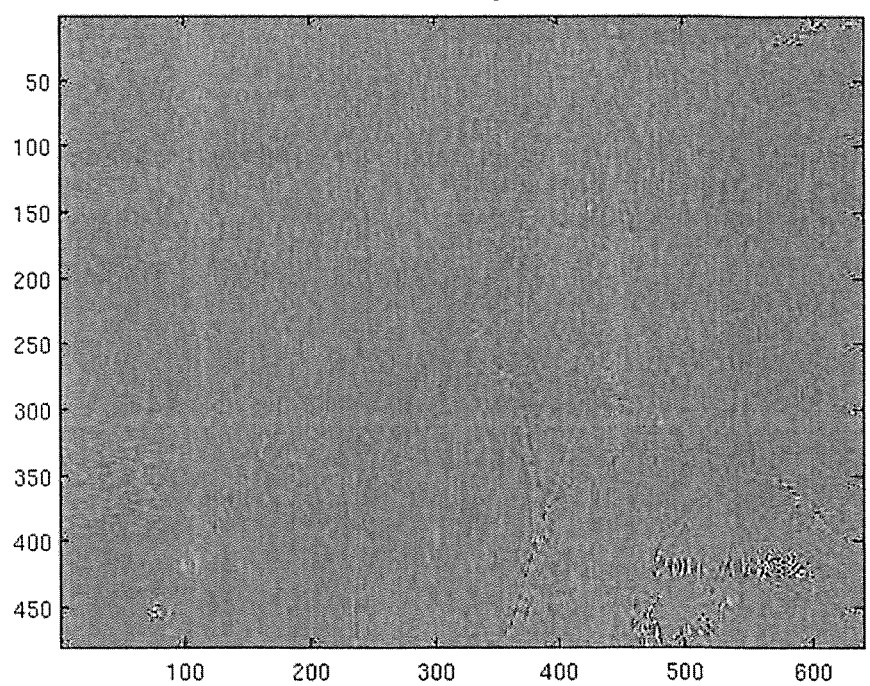
FIG. 33 is an illustrative grayscale image showing the error between the images of FIGS. 30 and 31.
Figure 34:
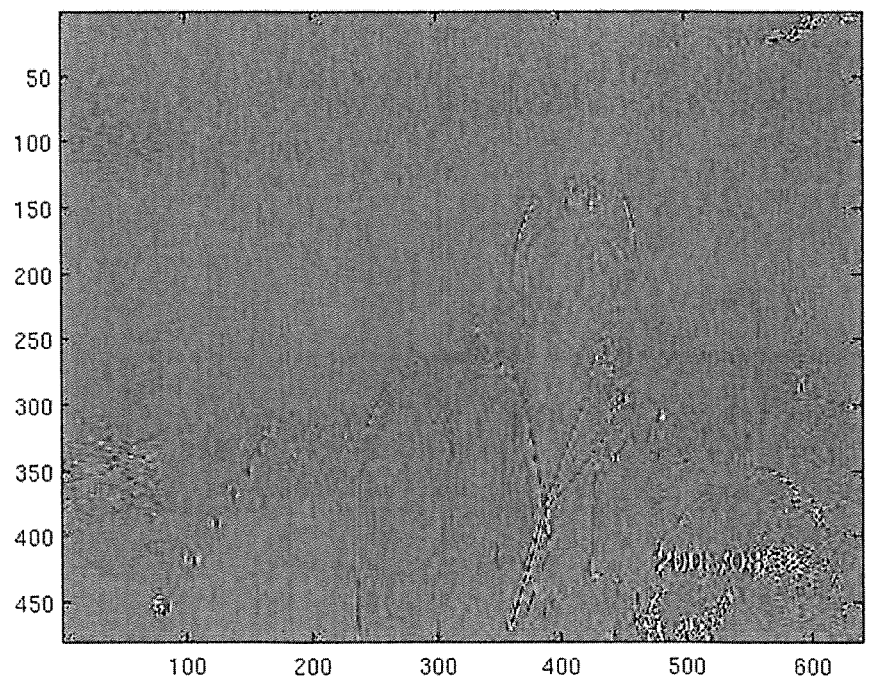
FIG. 34 is an illustrative grayscale image showing, for the images of FIGS. 31-33, the gained error between the original image and the reconstructed image.

FIG. 33 is an illustrative grayscale image 3300 showing the error between the images of FIGS. 30 and 31. FIG. 34 is an illustrative grayscale image 2400 showing, for the images of FIGS. 31-33, the gained error between the original image and the reconstructed image. Note that the image 3400 of FIG. 4 it is scaled to fit the gray color map and exaggerates the magnitude of the error as compared to the actual reconstructed image. The errors seem to be clustered around the areas of change, and especially change in boundaries that are vertical or nearly vertical lines. In addition, note that the use of averaged redundant slices read out in the opposite serpentine pattern (method 3) significantly improved the gained error of this image.

Methods, Assumptions and Procedures

During development of the instant invention, the analysis of the images and the approach to reading the data out of the array was done using Matlab and Simulink simulations of the ROTC and SDM ADC. Matlab and Simulink are simulation products familiar to those of skill in the art and available from The Mathworks of Natick, Mass. The design of the electronics hardware was performed using the Cadence schematic capture, Spectre simulator, and Virtuoso layout tools, both of which are well-known to those of skill in the art. Cadence schematic capture and Virtuoso layout tools are both available from Cadence of San Jose, Calif.

The application of an SDM ADC to imaging required processing the image pixels such that the value of a string of pixels changed in small steps. The inherent spatial bandwidth low pass filtering of an optical system insures that adjacent pixels are relatively close in value. By using a serpentine readout, the next pixel read is spatially adjacent to the present pixel and thus close in value. For the final implementation an image was divided into slices with a SDM ADC dedicated to each slice.

Matlab was used to slice the images and read out the pixels in a serpentine manner. That output was processed through a Simulink model of a SDM ADC. The output of the SDM ADC was reconstructed into an image using Matlab. The quantization noise of the SDM and image artifacts resulting from the readout method were investigated by comparing the initial image to the reconstructed image. A number of improvements to the processed image quality were made during development of the embodiments of the invention described herein.

The hardware was designed, simulated, and laid out to quantify the power and area requirements and to understand how those would compare to current ROICs.

The Matlab/Simulink model of the imaging electronics that is discussed herein both verified and refined the various embodiments and the serpentine readout approach. Initially, in one embodiment, the test images were divided into four slices and each slice was read out in a serpentine manner. This highlighted two SDM ADC related issues that were corrected. The first issue was a row to row artifact that resulted from the change in direction in the serpentine readout. This issue was resolved in a further embodiment by first adding a buffer pixel at the start and end of each row from the adjacent column, and secondly by creating redundant slices that are read out in the opposite direction. The values for each pixel from the primary and redundant slices were averaged to yield the value for the pixel in the output. The second artifact was between slices. This artifact was addressed in a still further embodiment by offsetting the redundant slices by one half slice width and averaging them in with the primary slices.

For one embodiment of the invention, the design of the electronics was accomplished and the rough layout was performed using a 180 nm CMOS process. The schematics are shown further in this application. The inventor demonstrated that all of the circuits for the TIA and the bump bond can be placed in the area of the pixel and also ran some simulations to demonstrate the performance of the circuits.

Flexibility of the ROIC described herein is a key requirement to support emerging SLS devices, in accordance with at least some embodiments of the invention. It is intended for the ROIC described herein to be capable of supporting a wide range of SLS based detectors. It is envisioned that the ROIC disclosed herein can be used with existing detectors from multiple companies/sources, in accordance with at least one embodiment of the invention. For example, many companies have designed existing detectors to work with the commercial off the shelf FLIR 9705 analog ROIC. It is anticipated that embodiments of the ROIC disclosed herein can be adapted to work with the FLIR 9705 compatible mechanical footprint.

Furthermore, the core read out data conversion design, described herein in accordance with at least some embodiments of the invention, is applicable to many other types of imaging devices and can be quickly adapted to interface to different types of pixels. As noted herein, imager readout architecture described herein can, in at least some embodiments, be implemented where the ROIC is configured as part of at least one of a focal plane imager array, strained layer superlattice imager (SLS), Back Side Illuminated CMOS (BSI-CMOS), Quantum Well Infrared Photodetector (QWIP), and Corrugated QWIP.

It is envisioned that the embodiments of the invention described herein also could be combined with the technologies described in the commonly assigned U.S. Pat. No. 7,215,270, entitled "Sigma-Delta Modulator having selectable OSR with optimal resonator coefficient,"; U.S. Pat. No. 7,576,671, entitled "Mismatch-shaping dynamic element matching systems and methods for multi-bit sigma-delta data converters,"; U.S. Pat. No. 7,605,652, entitled "Sigma-delta based class D audio power amplifier with high power efficiency,"; U.S. Pat. No. 7,612,608, entitled "Sigma-delta based class D audio or servo power amplifier with load noise shaping,"; and U.S. Pat. No. 7,860,189, entitled "Hybrid heterodyne transmitters and receivers." The contents of each of these patent applications are hereby incorporated by reference.

Throughout the present disclosure, absent a clear indication to the contrary from the context, it should be understood individual circuit elements as described may be singular or plural in number. For example, the terms "circuit" and "circuitry" may include either a single component or a plurality of components, which are either active and/or passive and are connected or otherwise coupled together to provide the described function. Additionally, the term "signal" may refer to one or more currents, one or more voltages, or a data signal. Within the drawings, like or related elements have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

Similarly, in addition, in the Figures of this application, in some instances, a plurality of system elements may be shown as illustrative of a particular system element, and a single system element or may be shown as illustrative of a plurality of particular system elements. It should be understood that showing a plurality of a particular element is not intended to imply that a system or method implemented in accordance with the invention must comprise more than one of that element, nor is it intended by illustrating a single element that the invention is limited to embodiments having only a single one of that respective elements. In addition, the total number of elements shown for a particular system element is not intended to be limiting; those skilled in the art can recognize that the number of a particular system element can, in some instances, be selected to accommodate the particular user needs.

In describing the embodiments of the invention illustrated in the figures, specific terminology (e.g., language, phrases, etc.) may be used for the sake of clarity. These names are provided by way of example only and are not limiting. The invention is not limited to the specific terminology so selected, and each specific term at least includes all grammatical, literal, scientific, technical, and functional equivalents, as well as anything else that operates in a similar manner to accomplish a similar purpose. Furthermore, in the illustrations, Figures, and text, specific names may be given to specific features, processes, military programs, etc. Such terminology used herein, however, is for the purpose of description and not limitation.

Although the invention has been described and pictured in a preferred form with a certain degree of particularity, it is understood that the present disclosure of the preferred form, has been made only by way of example, and that numerous changes in the details of construction and combination and arrangement of parts may be made without departing from the spirit and scope of the invention. Those of ordinary skill in the art will appreciate that the embodiments of the invention described herein can be modified to accommodate and/or comply with changes and improvements in the applicable technology and standards referred to herein. Variations, modifications, and other implementations of what is described herein can occur to those of ordinary skill in the art without departing from the spirit and the scope of the invention as claimed.

The particular combinations of elements and features in the above-detailed embodiments are exemplary only; the interchanging and substitution of these teachings with other teachings in this and the referenced patents/applications are also expressly contemplated. As those skilled in the art will recognize, variations, modifications, and other implementations of what is described herein can occur to those of ordinary skill in the art without departing from the spirit and the scope of the invention as claimed. The technology disclosed herein can be used in combination with other technologies. Accordingly, the foregoing description is by way of example only and is not intended as limiting. In addition, all publications and references cited herein are expressly incorporated herein by reference in their entirety.

Having described and illustrated the principles of the technology with reference to specific implementations, it will be recognized that the technology can be implemented in many other, different, forms, and in many different environments. Having described the preferred embodiments of the invention, it will now become apparent to one of ordinary skill in the art that other embodiments incorporating their concepts may be used. These embodiments should not be limited to the disclosed embodiments, but rather should be limited only by the spirit and scope of the appended claims. The invention's scope is defined in the following claims and the equivalents thereto.

What is claimed is:

1. An imaging readout method, the method comprising:
   providing an image;
   dividing the image into slices;
   employing a serpentine readout for each slice, the method comprising, starting at the top of the slices:
   reading odd-numbered rows from left to right; and
   reading even-numbered rows from right to left; and
   wherein the rows from top to bottom are read in a serpentine pattern.

2. The imaging readout method of claim 1, further comprising:
   using information based on the serpentine readout to identify image artifacts that include errors between adjacent rows.

3. The imaging readout method of claim 1, further comprising:
   using information based on the serpentine readout to identify image artifacts that include errors on the borders of the image slices.

4. The imaging readout method of claim 1, further comprising:
   using redundant image slices that overlap the original slices and that are read out in the opposite serpentine direction.

5. The imaging readout method of claim 2, further comprising:
   using information based on the opposite serpentine direction readout to identify and minimize image artifacts to be at or below the visual threshold of perception.

6. The imaging readout method of claim 1, wherein an image to be read comprises a plurality of rows of pixels and wherein the method further comprises:
   multiplexing each pixel in a row to a sigma-delta converter to realize a serpentine read out to an SDM ADC.

7. The imaging readout method of claim 6, further comprising at least one A/D conversion methods from the range of ADC conversions that range from a single ADC per pixel to a single ADC for an entire image array of pixels.

8. The imaging readout method of claim 1, further comprising:
   placing a small number of SDM ADCs outside of the active imaging area or pixels; and using a low power and space efficient multiplexor to implement a serpentine readout to the SDM ADC for an image slice.

9. The imaging readout method of claim 1, further comprising:
  providing a trans-impedance amplifier (TIA) used for one or more pixels; and
  providing a multiplexer in each row of each slice to reuse the TIA and reduce power.

\* \* \* \* \*